(12) United States Patent
Linsky et al.

(10) Patent No.: US 11,374,623 B2
(45) Date of Patent: Jun. 28, 2022

(54) CONNECTED ISOCHRONOUS STREAM SWAPPING

(71) Applicant: QUALCOMM Incorporated, San Diego, CA (US)

(72) Inventors: Joel Linsky, San Diego, CA (US); Mayank Batra, Cambridge (GB)

(73) Assignee: QUALCOMM INCORPORATED, San Diego, CA (US)

( * ) Notice: Subject to any disclaimer, the term of this patent is extended or adjusted under 35 U.S.C. 154(b) by 246 days.

(21) Appl. No.: 16/884,421

(22) Filed: May 27, 2020

(65) Prior Publication Data
US 2021/0376884 A1    Dec. 2, 2021

(51) Int. Cl.
| | |
|---|---|
| *H04B 5/06* | (2006.01) |
| *H04W 4/80* | (2018.01) |
| *H04B 5/00* | (2006.01) |
| *H04R 3/00* | (2006.01) |

(52) U.S. Cl.
CPC .............. *H04B 5/06* (2013.01); *H04B 5/0006* (2013.01); *H04R 3/00* (2013.01); *H04W 4/80* (2018.02); *H04R 2420/07* (2013.01)

(58) Field of Classification Search
CPC ................................ H04W 4/80; H04L 29/06
USPC ......... 370/477, 254, 389, 338; 345/520, 545
See application file for complete search history.

(56) References Cited

U.S. PATENT DOCUMENTS

| | | | |
|---|---|---|---|
| 2014/0002399 A1* | 1/2014 | Kambhatla | G09G 5/006 345/173 |
| 2017/0019244 A1* | 1/2017 | Zwart | H04L 5/16 |
| 2017/0311105 A1 | 10/2017 | Hariharan et al. | |
| 2017/0366924 A1 | 12/2017 | Thoen | |
| 2019/0253800 A1 | 8/2019 | Hsieh | |

OTHER PUBLICATIONS

Anonymous: "Frequently Asked Questions on LE Isochronous Channels | Bluetooth Technology Website", Mar. 2, 2020 (Mar. 2, 2020), 4 Pages, XP055820356, Retrieved from the Internet: URL: https://www.bluetooth.com/blog/10-frequently-asked-questions-on-le-isochronous-channels/ [retrieved on Jul. 1, 2021] p. 1.
International Search Report and Written Opinion—PCT/US2021/027469—ISA/EPO—dated Jul. 14, 2021.

* cited by examiner

*Primary Examiner* — Kiet M Doan
(74) *Attorney, Agent, or Firm* — Muncy, Geissler, Olds & Lowe, P.C.

(57) ABSTRACT

Devices and methods for connected isochronous stream (CIS) swapping are disclosed. In an example Bluetooth™ setting, a smartphone can be connected to multiple earbuds. It is possible that both earbuds include microphones, but only one microphone is enabled at a given time. That is, only one of the CISes established between the smartphone and the earbuds is bidirectional, and the other is unidirectional. The disclosed techniques enable the CISes to be swapped between the earbuds so that the earbud with better microphone quality will have ownership of the bidirectional CIS.

48 Claims, 16 Drawing Sheets

US 11,374,623 B2

CONNECTED ISOCHRONOUS STREAM SWAPPING

TECHNICAL FIELD

Aspects of this disclosure relate generally to wireless communication, and more particularly to Bluetooth connected isochronous stream (CIS) swapping and the like.

BACKGROUND

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long-Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

Wireless devices increasingly communicate by using multiple networks simultaneously. Moreover, they may compete with other devices to access the medium. For example, a source apparatus may communicate with a first device in accordance with a first network (for example, a short-range network like Bluetooth) while simultaneously communicating with a second device in accordance with a second network (for example, a mid-range network like WiFi). Meanwhile, a third device may be communicating in accordance with a third network, interfering with efforts of the source apparatus to communicate on the first network and/or the second network.

When multiple networks are used simultaneously, coexistence issues arise. For example, the source apparatus may be forced to communicate in bursts on the first network in order to avoid interfering with the second network and/or the third network. As a result, latency and bandwidth usage associated with the first network may increase. These improvements may be of special importance for time-critical communications, for example, those using classic Bluetooth Basic Rate/Enhanced Data Rate (BR/EDR) for operating in accordance with streaming audio protocols like Bluetooth's Advanced Audio Distribution Profile (A2DP). New techniques are needed for improving latency, reducing bandwidth usage, and reducing power consumption.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An example method performed by a local sink apparatus is disclosed. The method may comprise establishing a first connected isochronous stream (CIS) for communication with a source apparatus. The first CIS may be one of a bidirectional or a unidirectional link. The method may also comprise sending a first CIS indication to a remote sink apparatus. The first CIS indication may inform the remote sink apparatus of the first CIS established between the local sink apparatus and the source apparatus. The method may further comprise receiving a second CIS indication from the remote sink apparatus. The second CIS indication may inform the local sink apparatus of a second CIS established between the remote sink apparatus and the source apparatus. The second CIS may be the other of the bidirectional or the unidirectional link. The method may yet comprise determining whether or not a CIS swap should be performed. The determination may be made subsequent to establishing the first CIS and subsequent to receiving the second CIS indication from the remote sink apparatus. The method may yet further comprise performing the CIS swap when it is determined that the CIS swap should be performed. The CIS swap may comprise swapping ownerships of the first and second CISes with the remote sink apparatus. After completing the CIS swap, the local and remote sink apparatuses may communicate with the source apparatus respectively in accordance with the second and first CISes. The CIS swap may be performed without involving the source apparatus.

An example local sink apparatus is disclosed. The local sink apparatus may comprise a processor, a memory, and a transceiver. The processor, the memory, and/or the transceiver may be configured to establish a first connected isochronous stream (CIS) for communication with a source apparatus. The first CIS may be one of a bidirectional or a unidirectional link. The processor, the memory, and/or the transceiver may also be configured to send a first CIS indication to a remote sink apparatus. The first CIS indication may inform the remote sink apparatus of the first CIS established between the local sink apparatus and the source apparatus. The processor, the memory, and/or the transceiver may further be configured to receive a second CIS indication from the remote sink apparatus. The second CIS indication may inform the local sink apparatus of a second CIS established between the remote sink apparatus and the source apparatus. The second CIS may be the other of the bidirectional or the unidirectional link. The processor, the memory, and/or the transceiver may yet be configured to determine whether or not a CIS swap should be performed. The determination may be made subsequent to establishing the first CIS and subsequent to receiving the second CIS indication from the remote sink apparatus. The processor, the memory, and/or the transceiver may yet further be configured to perform the CIS swap when it is determined that the CIS swap should be performed. The CIS swap may comprise swapping ownerships of the first and second CISes with the remote sink apparatus. After completing the CIS swap, the local and remote sink apparatuses may communicate with the source apparatus respectively in accordance with the second and first CISes. The CIS swap may be performed without involving the source apparatus.

Another example local sink apparatus is disclosed. The local sink apparatus may comprise means for establishing a first connected isochronous stream (CIS) for communication with a source apparatus. The first CIS may be one of a bidirectional or a unidirectional link. The local sink apparatus may also comprise means for sending a first CIS indication to a remote sink apparatus. The first CIS indication may inform the remote sink apparatus of the first CIS established between the local sink apparatus and the source apparatus. The local sink apparatus may further comprise means for receiving a second CIS indication from the remote sink apparatus. The second CIS indication may inform the local sink apparatus of a second CIS established between the remote sink apparatus and the source apparatus. The second CIS may be the other of the bidirectional or the unidirectional link. The local sink apparatus may yet comprise means for determining whether or not a CIS swap should be performed. The determination may be made subsequent to establishing the first CIS and subsequent to receiving the second CIS indication from the remote sink apparatus. The local sink apparatus may yet further comprise means for performing the CIS swap when it is determined that the CIS swap should be performed. The CIS swap may comprise swapping ownerships of the first and second CISes with the remote sink apparatus. After completing the CIS swap, the local and remote sink apparatuses may communicate with the source apparatus respectively in accordance with the second and first CISes. The CIS swap may be performed without involving the source apparatus.

An example non-transitory computer-readable medium storing computer-executable instructions for a local sink apparatus is disclosed. The computer-executable instructions may comprise one or more instructions causing the local sink apparatus to establish a first connected isochronous stream (CIS) for communication with a source apparatus. The first CIS may be one of a bidirectional or a unidirectional link. The computer-executable instructions may also comprise one or more instructions causing the local sink apparatus to send a first CIS indication to a remote sink apparatus. The first CIS indication may inform the remote sink apparatus of the first CIS established between the local sink apparatus and the source apparatus. The computer-executable instructions may further comprise one or more instructions causing the local sink apparatus to receive a second CIS indication from the remote sink apparatus. The second CIS indication may inform the local sink apparatus of a second CIS established between the remote sink apparatus and the source apparatus. The second CIS may be the other of the bidirectional or the unidirectional link. The computer-executable instructions may yet comprise one or more instructions causing the local sink apparatus to determine whether or not a CIS swap should be performed. The determination may be made subsequent to establishing the first CIS and subsequent to receiving the second CIS indication from the remote sink apparatus. The computer-executable instructions may yet further comprise one or more instructions causing the local sink apparatus to perform the CIS swap when it is determined that the CIS swap should be performed. The CIS swap may comprise swapping ownerships of the first and second CISes with the remote sink apparatus. After completing the CIS swap, the local and remote sink apparatuses may communicate with the source apparatus respectively in accordance with the second and first CISes. The CIS swap may be performed without involving the source apparatus.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

Figure 1:
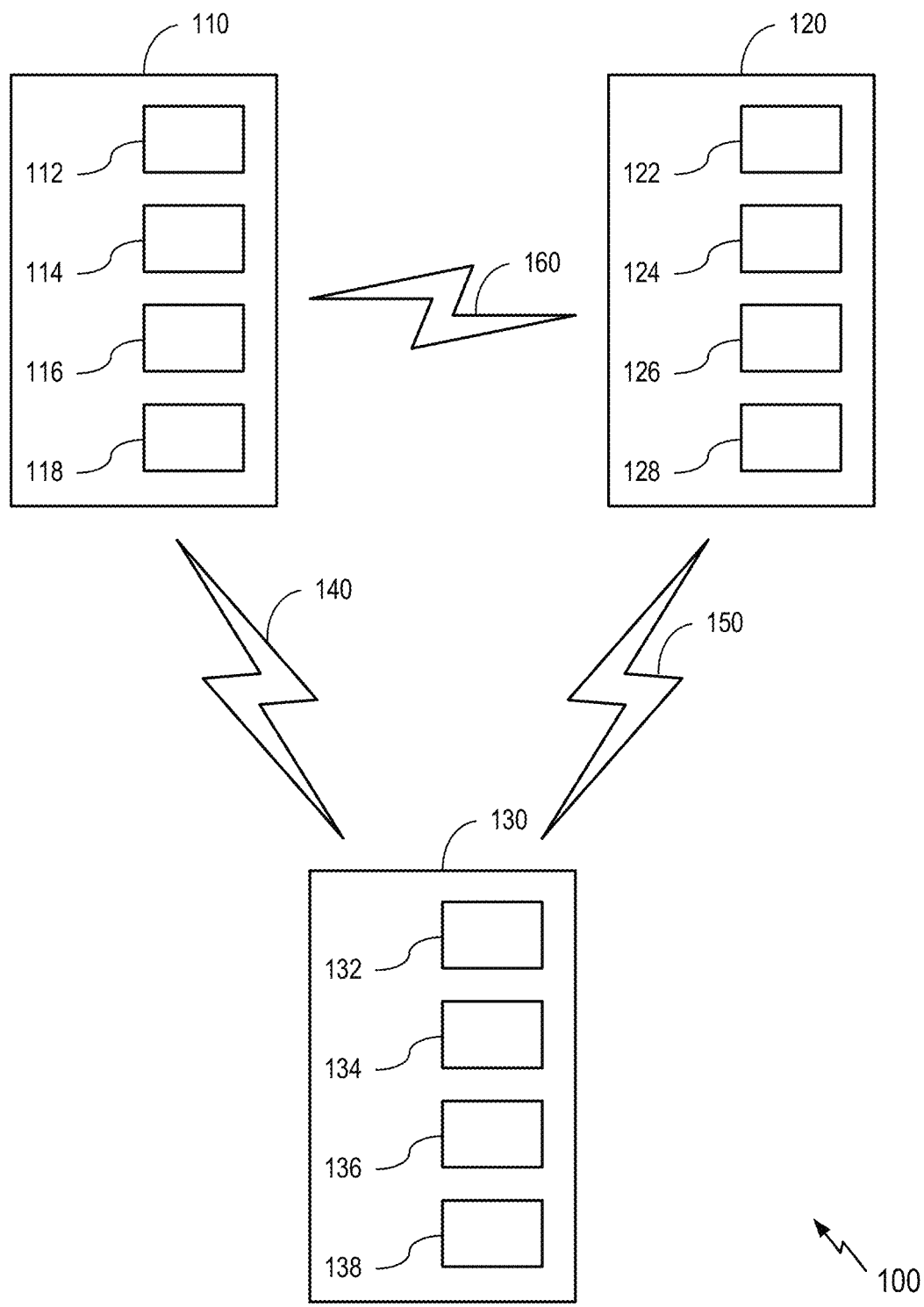
FIG. 1 illustrates an example wireless environment, in accordance with one or more disclosed aspects.

FIG. 1 generally illustrates a wireless environment 100 that includes a sink apparatus 110, another sink apparatus 120, and a source apparatus 130. For example, the sink apparatuses 110, 120 may be Bluetooth™ earbuds (e.g., left and right) and the source apparatus 130 may be a smart phone. The smartphone may be streaming audio data (e.g., music) to the earbuds, i.e., the smart phone may be the source and the earbuds may be the sinks of the audio data. Hence, the wireless environment 100 is generalized as comprising sink and source apparatuses. Also, as will be detailed further below, much of the description will be from the perspective of one of the sink apparatuses, e.g., the sink apparatus 110. Hence, the sink apparatus 110 may also be referred to as "local" sink apparatus 110, and the sink apparatus 120 may be referred to as "remote" sink apparatus.

It should be noted that the names "sink" and "source" apparatuses are used for convenience. That is, the roles of the sink apparatuses 110, 120 are not limited to that of being a data sink, and the role of the source apparatus 130 is not limited to that of being a data source. One or both sink apparatuses 110, 120 may also act as data sources. Conversely, the source apparatus 130 may act as data sink. For example, one or both earbuds may be configured with microphones to generate audio data that the smart phone receives.

The local sink apparatus 110 and the source apparatus 130 may communicate with each other over one or more communication links 140. The remote sink apparatus 120 and the source apparatus 130 may communicate with each other over one or more communication links 150. Finally, local and remote sink apparatuses 110, 120 may communicate with each other over one or more communication links 160. The communication links 140, 150, and/or 160 may be wireless links. The links 140, 150, and/or 160 may be Bluetooth low energy (LE) isochronous channels for example. Communication may take place in the form of transmitting and receiving data packets. It should be understood that there can be any number of sink apparatuses and also any number of source apparatuses.

The local sink apparatus 110 may include a transceiver system 112 comprising one or more transceivers, a memory system 114 comprising one or more memories, a processing system 116 comprising one or more processors, and other components 118. The transceiver system 112 may be configured to transmit and/or receive signals over the links 140, 160, and/or any other medium. The transceiver system 112 may be configured to operate in accordance with a Bluetooth protocol, a wireless land area network (WLAN) protocol, a wireless wide area network (WWAN) protocol, and/or any other suitable protocol. As an example, the transceiver system 112 may be configured to transmit and/or receive streaming audio data.

The memory system 114 may be configured to store data, instructions, or a combination thereof. The memory system 114 may comprise Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of non-transitory storage medium. As used herein the term "non-transitory" does not exclude any physical storage medium or memory and particularly does not exclude dynamic memory (e.g., RAM) but rather excludes only the interpretation that the medium can be construed as a transitory propagating signal.

The processing system 116 may be coupled to the transceiver system 112, the memory system 114, and the other components 118. The processing system 116 may be configured to perform operations in accordance with the instructions stored in the memory system 114. The processing system 116 may be configured to transmit commands to the other components of the local sink apparatus 110. The commands may be transceiver commands associated with tuning to a particular frequency, transmitting and receiving in accordance with a particular timing, or transferring data to or from the transceiver system 112. Additionally or alternatively, the commands may be memory commands associated with storing and/or retrieving data and/or instructions.

The other components 118 may include one or more user inputs, one or more user output, a battery, and/or any other suitable components. The one or more user inputs may include a microphone configured to convert audio (e.g., user speech) into corresponding electronic signals for transmission. The one or more user outputs may include a speaker configured to receive an electronic signal from within the local sink apparatus 110 and convert the electronic signal into an audio signal.

The remote sink apparatus 120 may include a transceiver system 122, a memory system 124, a processing system 126, and optional other components 128. The transceiver system 122, the memory system 124, the processing system 126, and the other components 128 may be analogous to the transceiver system 112, the memory system 114, the processing system 116, and the other components 118 included in the local sink apparatus 110. For brevity, further description of these components will be omitted.

In some implementations, the local sink apparatus 110 and the remote sink apparatus 120 may collectively be provided as wireless earbuds. For example, the wireless earbuds may be configured to play, into the ears of a listener, stereo sound comprising left and right audio streams. The local sink apparatus 110 may transmit the left audio stream while the remote sink apparatus 120 transmits the right audio stream, or vice-versa.

The source apparatus 130 may include a transceiver system 132, a memory system 134, a processing system 136, and optional other components 138. The transceiver system 132, the memory system 134, the processing system 136, and the other components 138 may be analogous to the transceiver system 112, the memory system 114, the processing system 116, and the other components 118 included in the local sink apparatus 110. For brevity, further description of these components will be omitted. The source apparatus 130 may comprise a set top box, a music player, a video player, an entertainment unit, a navigation device, a personal digital assistant (PDA), a fixed location data unit, a computer, a laptop, a tablet, a communications device, a mobile phone, or any other suitable device.

Figure 2:
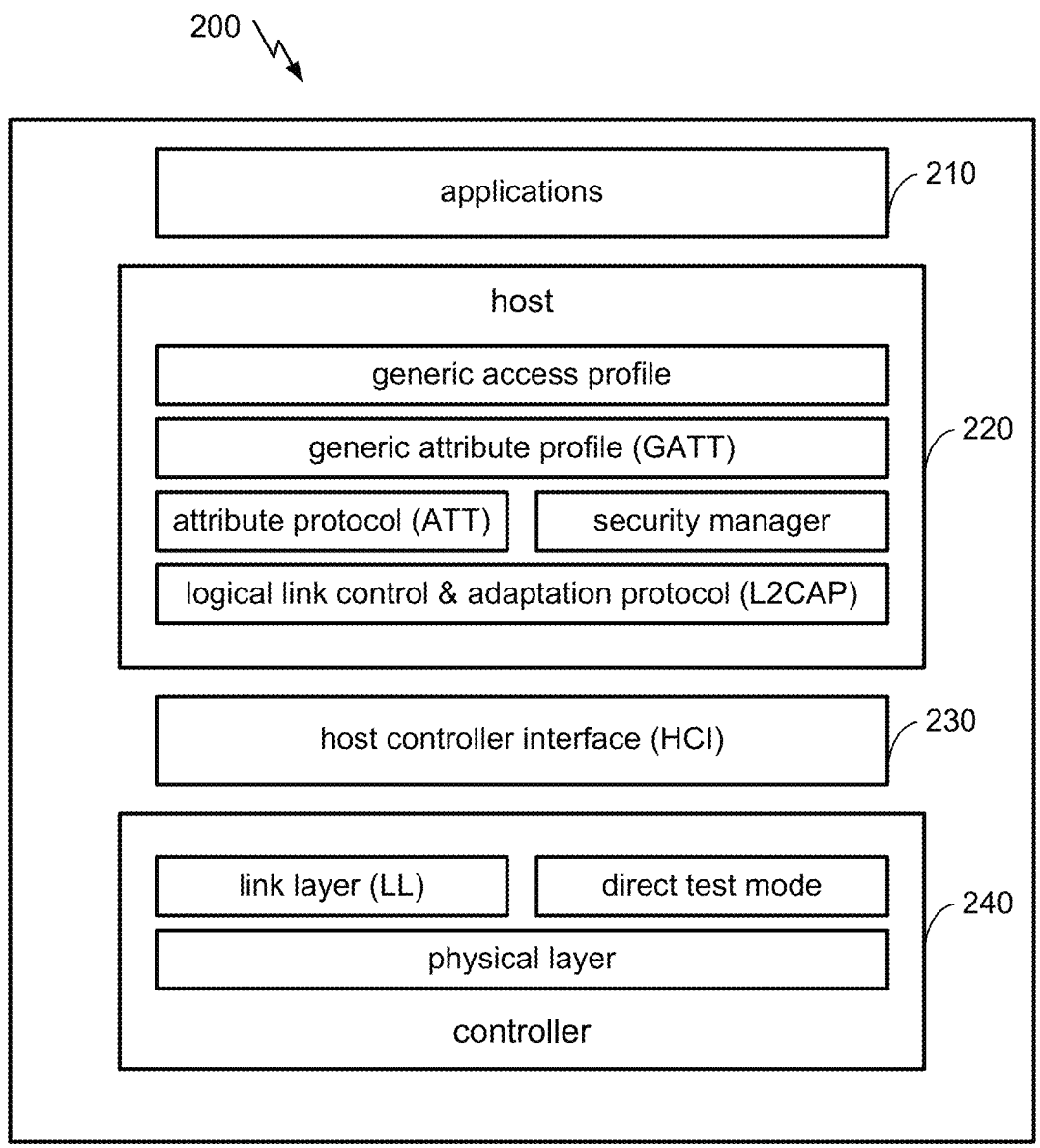
FIG. 2 illustrates an example of a Bluetooth™ stack architecture.

FIG. 2 illustrates an example Bluetooth™ stack architecture 200. The architecture 200 has several components including application 210, host 220, host controller interface (HCI) 230, and controller 240. Each of the components can include stack layers. For example, the host 220 can include the following layers: generic access profile, generic attribute profile (GATT), attribute protocol (ATT), security manager, and logical link control and adaptation protocol (L2CAP). The controller 240 can include the following layers: link layer (LL), direct test mode, and physical (PHY) layer. The HCI 230 may define a series of commands that the host 220 may use to communicate with the controller 240 and events that the controller 240 may use to communicate with the host 220.

In an aspect, processing system, memory system, and/or transceiver system of apparatuses may be configured to implement the illustrated architecture 200. For example, the processing system 116, the memory system 114, and/or the transceiver system 112 of the local sink apparatus 110 may be configured to implement local applications, local host, local HCI, and/or local controller. As another example, the processing system 126, the memory system 124, and/or the transceiver system 122 of the remote sink apparatus 120 may be configured to implement remote applications, remote host, remote HCI, and/or remote controller. As a further example, the processing system 136, the memory system 134, and/or the transceiver system 132 of the source apparatus 130 may be configured to implement source applications, source host, source HCI, and/or source controller.

Between Bluetooth apparatuses, different types of communication links may be established. For exchange of control and/or user data, asynchronous connection-less (ACL) link may be established. But for streaming time-bound data (e.g., audio data), connected isochronous stream (CIS) link may be established. A CIS may be bidirectional or unidirectional.

Figure 3:
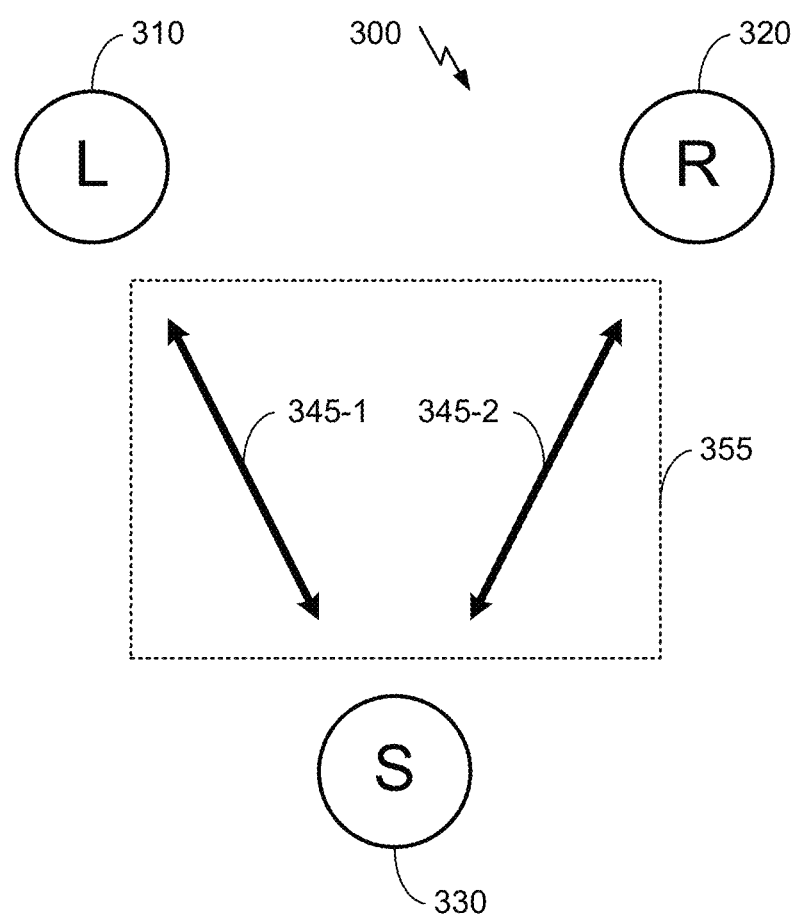
FIG. 3 illustrates another example wireless environment, in accordance with one or more disclosed aspects.

FIG. 3 illustrates a wireless environment 300 to explain CIS in more detail. The wireless environment 300 includes a local sink apparatus 310 (e.g., left or right earbud), a remote sink apparatus 320 (e.g., other of left or right earbud), and a source apparatus 330 (e.g., smart phone). The apparatuses 310, 320, 330 may be same as or similar to the apparatuses 110, 120, 130, respectively. A first CIS 345-1 may be established between the local sink apparatus 310 and the source apparatus 330, and a second CIS 345-2 may be established between the remote sink apparatus 320 and the source apparatus 330. The first and second CISes 345-1, 345-2 (collectively or singularly 345) may be members of a connected isochronous group (CIG) 355. In general, a CIG may have one or more CISes as members. The CISes within a same CIG can have a common timing reference data used to synchronize isochronous data processing (e.g., render audio data) by all receivers of CISes. The source apparatus 330 may stream isochronous data to the local and remote sink apparatuses 310, 320 over the first and second CISes 345. For example, when streaming music data, the source apparatus 330 may stream a left-stereo data on one of the CISes 345-1, 345-2, and stream a right-stereo data on other of the CISes 345-1, 345-2.

The first CIS 345-1 may be bidirectional or unidirectional. When it is bidirectional, the local sink apparatus 310 may stream audio data captured by its microphone to the source apparatus 330. Likewise, the second CIS 345-2 may be bidirectional or unidirectional. In earbuds voice use scenario, it is possible that both earbuds include microphones. However, only one earbud will have its microphone enabled at a given moment in time.

When a CIG is created, a bidirectional CIS may be created between the smartphone and one of the earbuds, and a unidirectional CIS may be created between the smartphone and the other of the earbuds. In some situation, swapping the CIS may be desirable. For example, the enabled microphone may stop working. As another example, the battery of the earbud may be running low. Unfortunately, under conventional mechanism, the CIS cannot be swapped on the fly. Alternatively, both CISes may be bidirectional. But this is suboptimal in that the CIS of the earbud whose microphone is not enabled would still use up airtime and resources for non-existent voice packets from the earbud.

To address these and other issues of conventional connected isochronous data processing, it is proposed to provide a mechanism to swap the CIS on the fly, i.e., dynamically such that the earbud that has better quality gets the ownership of the bidirectional CIS. More generally, the proposed mechanism(s) can enable dynamic CIS swapping so that the sink apparatus that has more desirable input characteristics gets the ownership of the bidirectional CIS. In an aspect, the ACL ownership may also be swapped.

In an aspect, the following may be assumed:
The CISes being swapped belong to the same CIG;
The sink apparatuses may be connected to multiple source apparatuses at the same time;
Each source apparatus may establish more than one CIG with the sink apparatuses;
The sink apparatuses may be are connected to each other on a transport (e.g., low energy (LE) transport) and a link layer (LL) connection has been established between them. One of the sink apparatuses may be a master and the other may be a slave.

The proposed technique/mechanism may include the following stages: (1) Informing CIS establishment to other sink apparatus; (2) CIS swap determination; (3) Swapping CIS ownership; (4) Marshalling ACL state information; and (5) Swapping ACL ownership. In one or more aspect, stages (4) and (5) may be viewed as being optional.

These stages are described in more detail below with reference to FIGS. 4A and 4B, which illustrate a flow of signals between components of master and slave sink apparatuses as well as with source apparatus. In particular, flows from/to host and controller of the master sink apparatus (labeled as "m-host" and "m-controller") and flows from/to host and controller of the slave sink apparatus (labeled as "s-host" and "s-controller") are shown. Also, while not illustrated, communications between m-host and m-controller may be performed via m-HCI, and communications between s-host and s-controller may be performed via s-HCI.

(1) Informing CIS Establishment to Other Sink Apparatus

When a sink apparatus establishes a CIS with a source apparatus, it may inform the other sink apparatus, e.g., by sending a CIS indication. In particular, a controller may send a CIS_ESTABLISHED_IND protocol data unit (PDU) to a controller of the other sink apparatus.

Figure 4A:
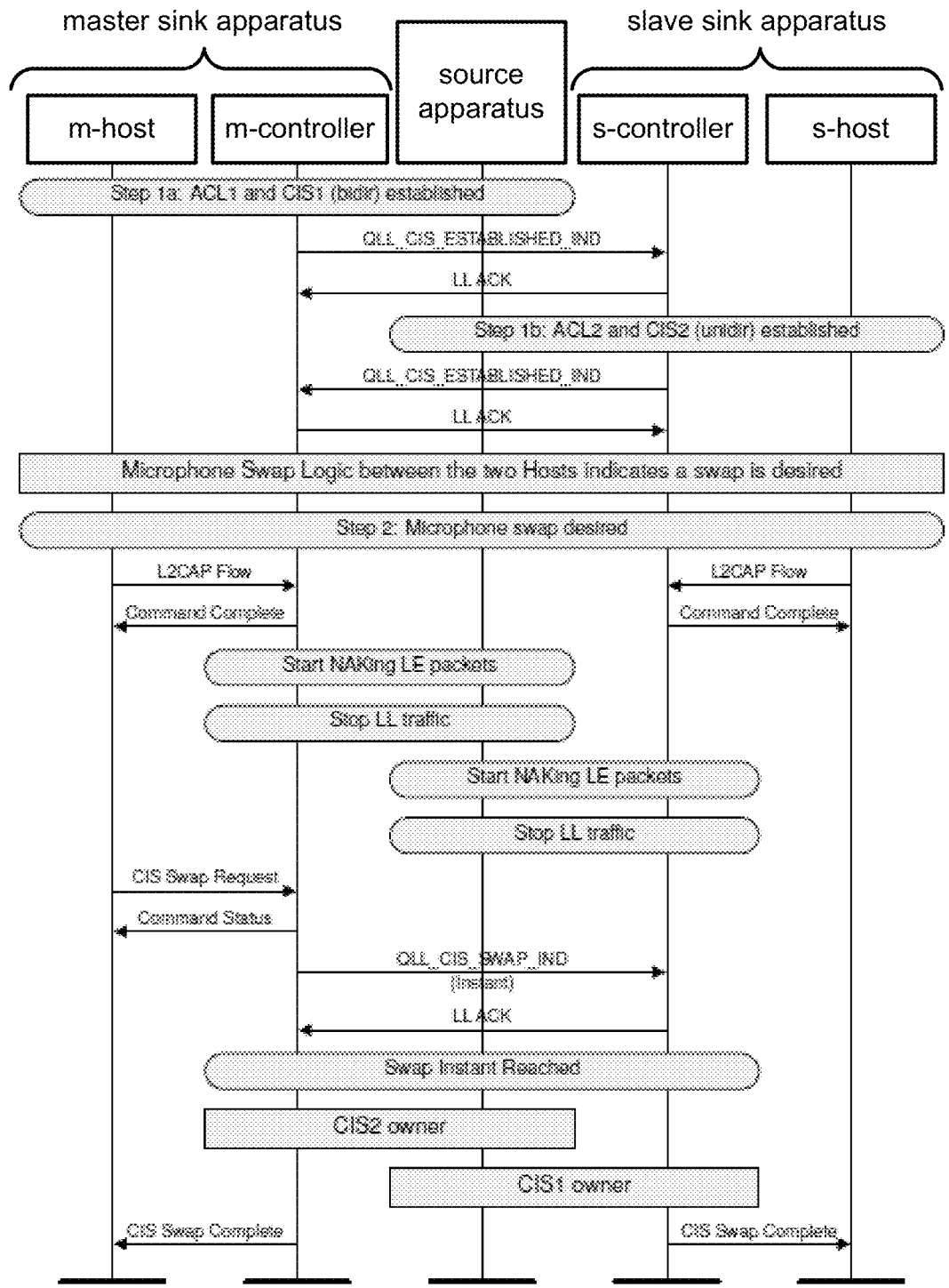
FIGS. 4A and 4B illustrate example flow of signals between apparatuses for swapping ownerships of connected isochronous streams (CIS), in accordance with one or more disclosed aspects.

In FIG. 4A, it is seen that when ACL1 and CIS1 are established between the master sink apparatus and the source apparatus, the m-controller sends master CIS_ESTABLISHED_IND PDU to the s-controller, and the s-controller acknowledges by sending a corresponding LL ACK. Similarly, when ACL2 and CIS2 are established between the slave sink apparatus and the source apparatus, the s-controller sends slave CIS_ESTABLISHED_IND PDU to the m-controller, and the m-controller acknowledges by sending a corresponding LL ACK.

The CIS_ESTABLISHED_IND PDU may include all information necessary for the CIS swap that may take place later. The CIS_ESTABLISHED_IND PDU may include one or more of the following fields (parameters):

Remote Public Address to indicate the public address of the source apparatus with which the CIS has been created;
CIG_ID to indicate the identifier of the CIG that the CIS is part of;
CIS_ID to indicate the identifier of the CIS that needs to be swapped in the future;
Access Address to indicate the Access Address of the CIS;
Flags to indicate high speed (HS) and/or encryption;
Coded Access Address set to indicate the Coded Access Address of the CIS if the CIS is using HS;
CIS_Offset to indicate the time from the ACL anchor point of the connection event that is referenced by the Ref_connEventCount field to the CIS anchor point referenced by the cisEventCounter field;
CIS_Sync_Delay to indicate the CIS_Sync_Delay of the CIS;
Ref_connEventCount set to a connection event counter value on the LE ACL connection between the sink apparatuses that meets the requirement $$currEvent-thresh\_val < Ref\_connEventCount < currEvent + thresh\_val$$

where currEvent is the ACL connection event counter value for the connection event where the QLL_CIS_ESTABLISHED_IND PDU is being transmitted;
Max_SDU_S_To_M to indicate the maximum size of an SDU, from the slave's Host;
Max_PDU_S_To_M to indicate the maximum size of a PDU, from the slave to the master;
Sub_Interval shall to indicate the time between the start of a subevent and the start of the next subevent for the CIS in the same CIS event;
BN_S_To_M to indicate the BN value used from the slave to master;
cisEventCounter to indicate the CIS event counter value of the CIS event referenced by the CIS_Offset;
Session Key to indicate the session key used for the CIS and its associated ACL;
CIS_IV to indicate the initialization vector used for the CIS.

(2) CIS Swap Determination

The hosts of the sink apparatuses determine that quality of input data of sink apparatus with the unidirectional CIS is higher than quality of input data of sink apparatus with the bidirectional CIS. The hosts then may request the controllers to NAK LE packets on the ACL connection and stop the LL traffic using HCI commands.

In FIG. 4A, it is seen that when it is determined that microphone swap is desired, the m-host sends one or more commands to the m-controller. The m-controller responds by NAKing the LE packets from the source apparatus, and by stopping the LL traffic with the source apparatus. Likewise, the s-host sends one or more commands to the s-controller, which responds by NAKing the LE packets from the source apparatus, and by stopping the LL traffic with the source apparatus.

(3) Swapping CIS Ownership

The host of the master sink apparatus, i.e., the m-host, may initiate a swap of the CISes using a HCI command. The master sink apparatus may send a CIS_SWAP_IND PDU to the slave sink apparatus. The CIS_SWAP_IND PDU may include one or more of the following fields (parameters):

Remote Public Address to indicate public address of the source apparatus with which the CIS has been created;
CIG-ID of the CISes that are to be swapped; and
Instant field that indicates the connEventCount at or after which the CIS ownership are swapped.

The slave may respond with a Link Layer acknowledgement. When connEventCount is equal to the Instant field, the ownership of the CISes may change. Controllers of both master and slave sink apparatuses may notify their respective hosts.

In FIG. 4A, it is seen that the m-host initiates the CIS swap by sending one or more commands (e.g., one or more HCI commands) to the m-controller. The m-controller in turn may send the CIS_SWAP_IND PDU to the s-controller, and the s-controller may respond. Thereafter, when the swap instant is reached, the ownerships of the CISes are swapped between the sink apparatuses. When the CISes are swapped, the isochronous streams received by the master and slave sink apparatuses are swapped. The m-controller and the s-controller may respectively notify the m-host and the s-host that the CIS swap is complete.

Note that the CIS swap may be performed without the involvement of the source apparatus. That is, the source apparatus need not have knowledge of the CIS swap. The swap may be performed also without the involvement of the m-host and/or the s-host. That is, the CIS swap may be performed autonomously by the m-controller and/or the s-controller.

While not shown, the ACL communication may be resumed with the existing ACLs if it is decided that ACL swap will not be performed. If it is decided to resume ACL communication, then the m-controller may start ACKing the LE packets from the source apparatus, and resume the LL traffic with the source apparatus. Similarly, the s-controller may start ACKing the LE packets from the source apparatus, and resume the LL traffic with the source apparatus.

(4) Marshalling ACL State Information

Optionally, it may also be desirable to swap the ACL ownerships as well when the CIS ownerships are swapped. In such instances, the controllers of the sink apparatuses may send the state information of the associated ACL connections to their respective hosts using one or more HCI events. The hosts of both sink apparatuses may marshall the state information to each other and then provide the received state information to their respective controllers.

Figure 4B:
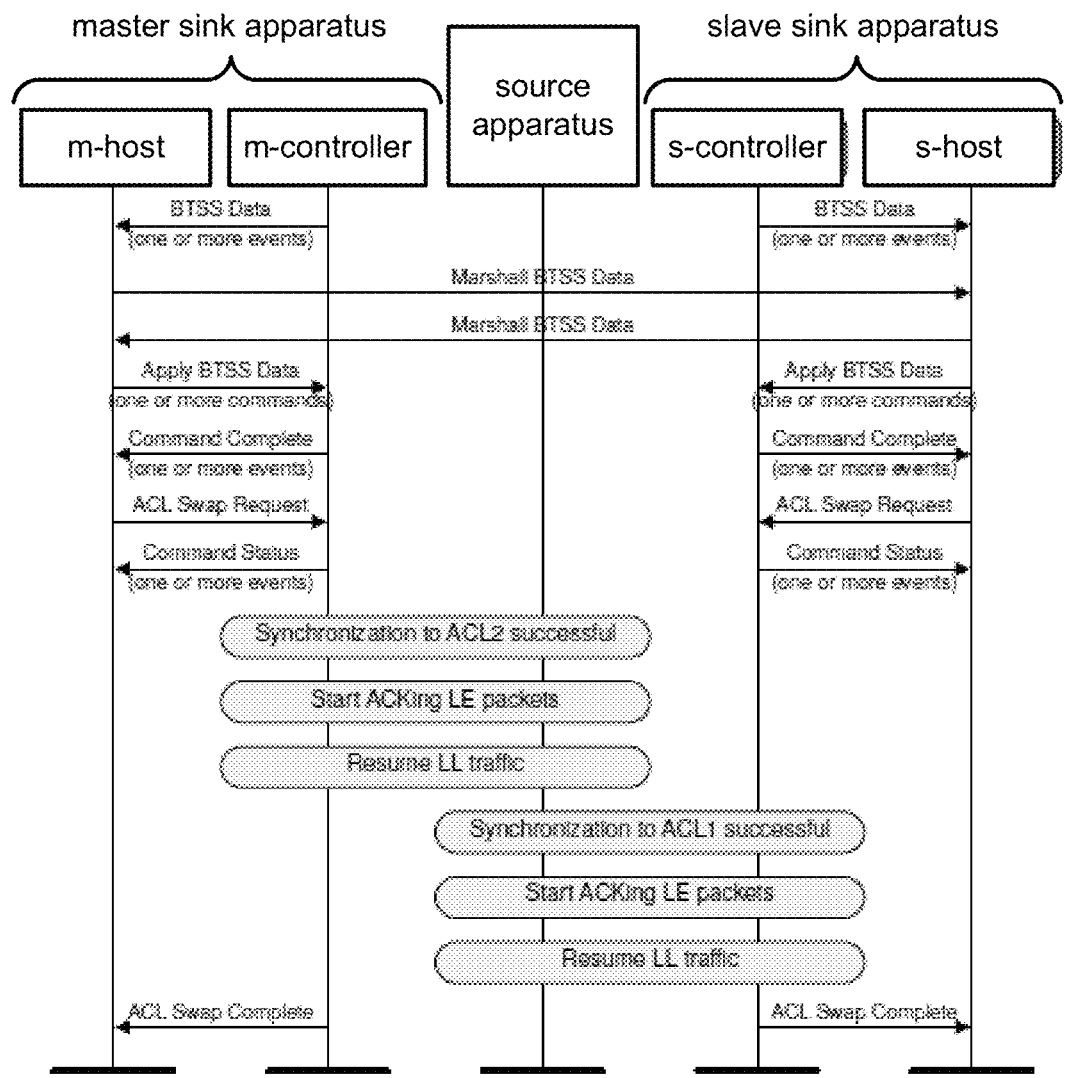

In FIG. 4B, it is seen that the m-controller sends subsystem data (e.g., Bluetooth subsystem (BTSS) data to the m-host in one or more HCI events. This subsystem data may comprise state information associated with one or more connections of ACL1. Likewise, the s-controller sends subsystem data (e.g., Bluetooth subsystem (BTSS) data to the m-host in one or more HCI events. This subsystem data may comprise state information associated with one or more connections of ACL2. Thereafter, the m-host and the s-host send their respective subsystem data to each other. After receipt, the m-host and the s-host send one or more command to their respective m-controller and s-controller to apply the received subsystem data.

(5) Swapping ACL Ownership

The hosts of both sink apparatuses may initiate a swap of the ACLs using one or more HCI commands. Each controller may synchronize to the ACL connection using the state information provided by the host. If the synchronization is successful, then the controller may notify its host and stop synchronization with the existing ACL. The controller need not change the Connection_Handle of the ACL. If the controller is unable to synchronize within some number (e.g., six) of ACL connection events, then the controller shall may indicate a failure to its host and continue to maintain synchronization with the existing ACL.

In FIG. 4B, at the master sink apparatus, the m-host initiates the ACL swap by providing one or more commands to the m-controller. In response, the m-controller synchronizes the connections of the ACL associated with the subsystem data received from slave sink apparatus. To complete resumption of communication with the source apparatus, the m-controller starts ACKing the LE packets from the source apparatus, and resumes the LL traffic with the source apparatus. The m-controller notifies the m-host of the ACL swap completion, e.g., through one or more HCI events.

At the slave sink apparatus, the s-host initiates the ACL swap by providing one or more commands to the s-controller. In response, the s-controller synchronizes the connections of the ACL associated with the subsystem data received from master sink apparatus, starts ACKing the LE packets from the source apparatus, and resumes the LL traffic with the source apparatus. The s-controller notifies the s-host of the ACL swap completion, e.g., through one or more HCI events.

Similar to the CIS swap, the ACL swap may also be performed without the involvement of the source apparatus. That is, the source apparatus need not have knowledge of the ACL swap. The ACL swap may be performed also without the involvement of the m-host and/or the s-host, i.e., the ACL swap may be performed autonomously by the m-controller and/or the s-controller.

Figure 5A:
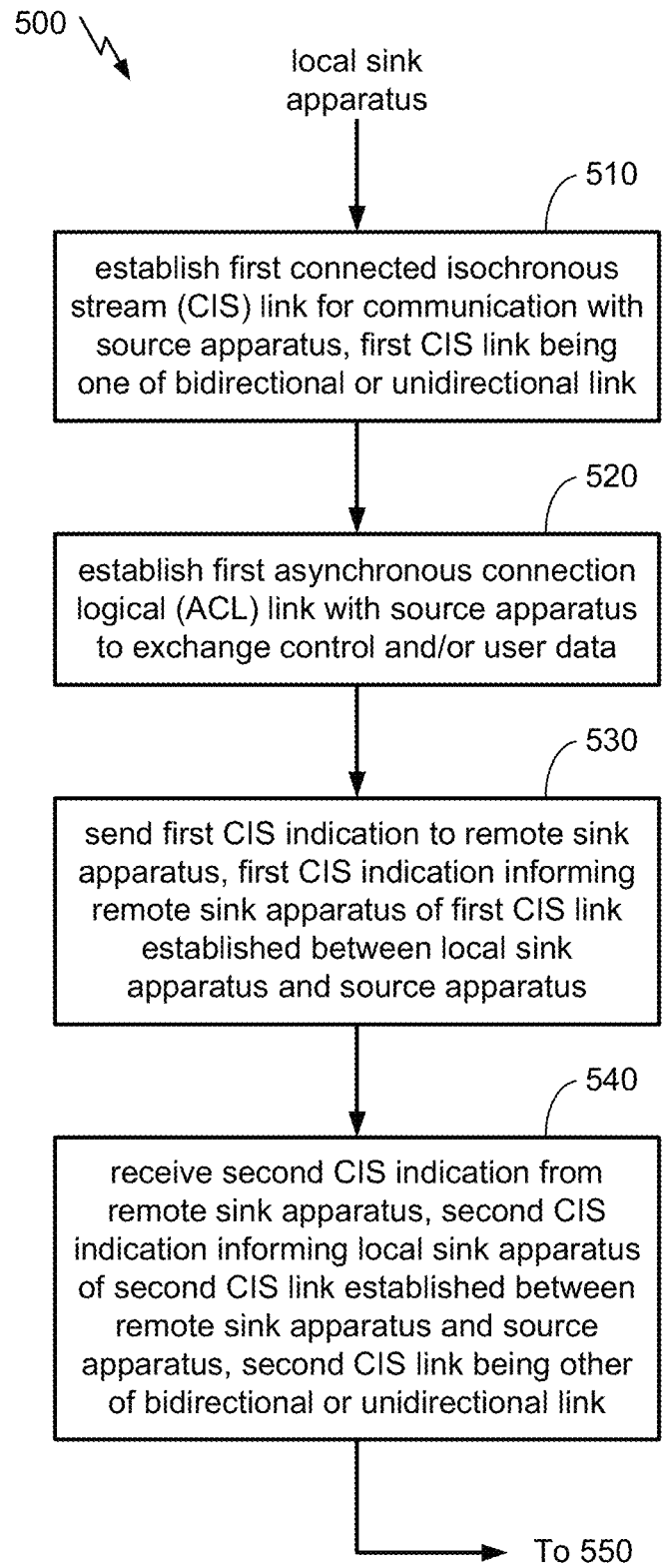
FIGS. 5A-17 illustrate flow charts of an example method performed by a sink apparatus for swapping ownerships of connected isochronous streams (CIS) and of asynchronous connection-less (ACL) links, in accordance with one or more disclosed aspects.
Figure 5B:
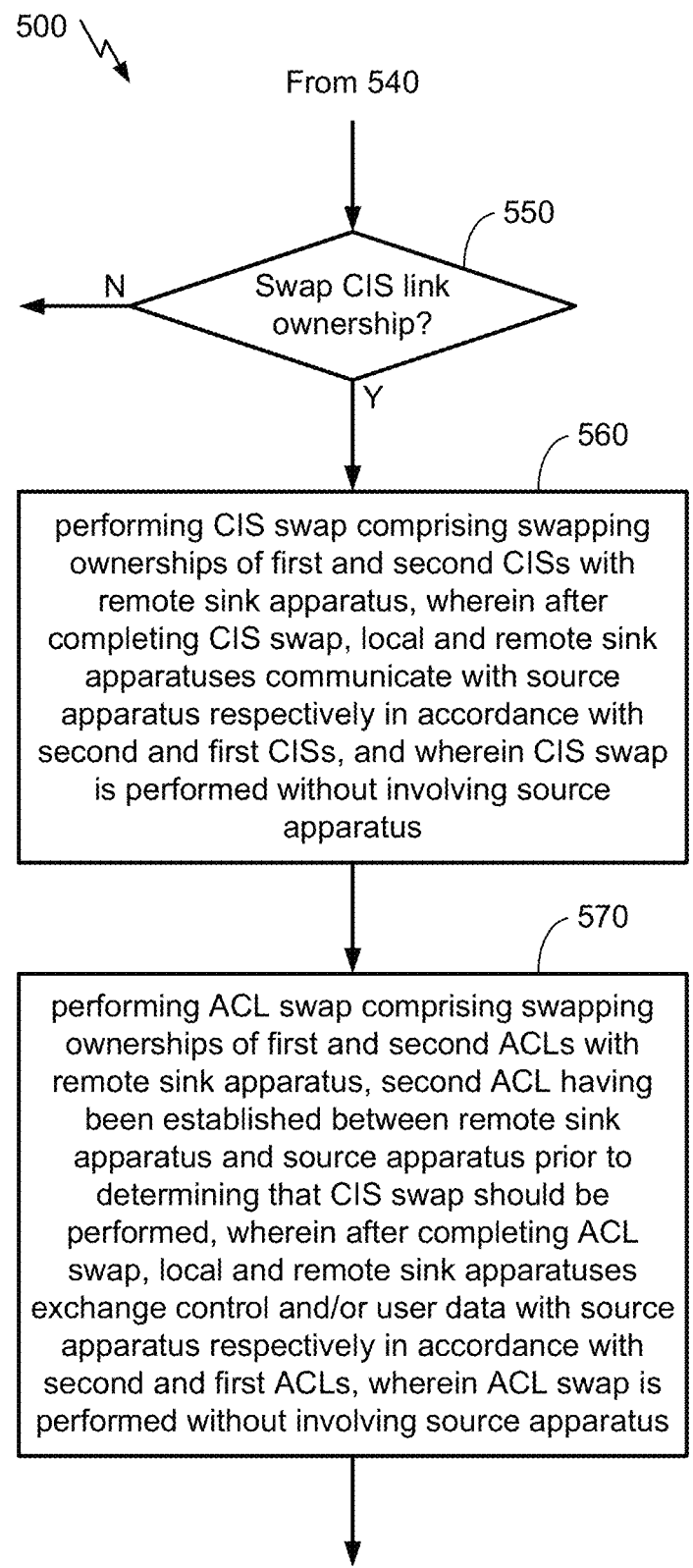

FIGS. 5A and 5B generally illustrate a flow chart of an example method 500 performed to swap CIS and optionally swap ACL from the perspective of the local sink apparatus 110. Between the local and remote sink apparatuses 110, 120, one may be the master and the other may be the slave.

In block 510, the local sink apparatus 110 may establish a first CIS for communication with the source apparatus 130. The first CIS may be bidirectional or unidirectional. In block 520, the local sink apparatus 110 may also establish a first asynchronous connection-less (ACL) link also with the source apparatus 130. Block 520 will be discussed further below in relation to block 570.

In block 530, the local sink apparatus 110 may send a first CIS indication to the remote sink apparatus 120. The first CIS indication may inform the remote sink apparatus 120 of the first CIS established between the local sink apparatus 110 and the source apparatus 130.

In block 540, the local sink apparatus 110 may receive a second CIS indication from the remote sink apparatus 120. The second CIS indication may inform the local sink apparatus 110 of a second CIS established for communication between the remote sink apparatus 120 and the source apparatus 130. The second CIS may also be bidirectional or unidirectional.

The first and second CISes may respectively be used to stream first and second forward isochronous data (e.g., first and second music audio data). For example, when they are established, initially, the source apparatus 130 may stream the first isochronous data to the local sink apparatus 110 over the first CIS, and may stream the second isochronous data to the remote sink apparatus 120 over the second CIS.

Also, between the first and second CISes, one may be bidirectional and the other may be unidirectional. Whichever is bidirectional, that CIS may stream reverse isochronous data (e.g., microphone audio data). For example, if the first (second) CIS is bidirectional, then initially (e.g., prior to performing CIS swap), the first (second) CIS may be used to stream the reverse isochronous data from the local sink apparatus 110 (the remote sink apparatus 120) to the source apparatus 130. Note that terms "forward" and "reverse" are used for convenience to indicate that the isochronous data is streamed from or to the source apparatus 130.

Which of the first and second CISes will be bidirectional and which will be unidirectional at establishment may be determined in a number of ways. In one aspect, this may be preset within the local sink apparatus 110 and the remote sink apparatus 120. For example, in the earbuds case, the earbuds typically come in pairs—e.g., left and right. In this instance, one may be preset to establish the bidirectional CIS and the other may be preset to establish the unidirectional CIS. In another aspect, the roles of the local sink apparatus 110 and the remote sink apparatus 120 may be considered. For example, the local sink apparatus 110 and the remote sink apparatus 120 may be configured such that the master establishes one of the bidirectional and unidirectional CISes, and the slave establishes the other of the CISes. In yet another aspect, the local sink apparatus 110 and the remote sink apparatus 120 may negotiate with each other prior to establishing the CISes.

Figure 6:
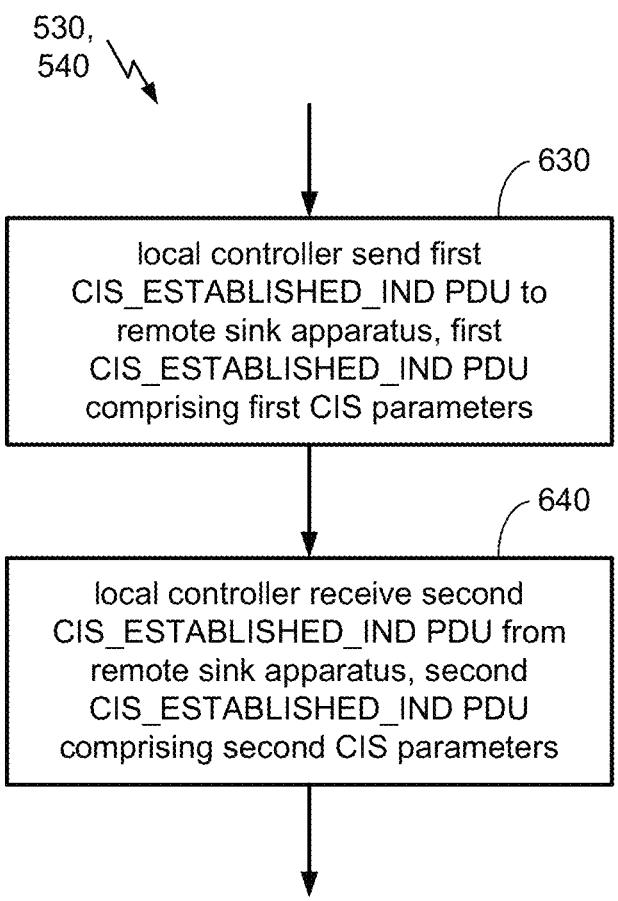

FIG. 6 illustrates a flow chart of an example process performed by the local sink apparatus 110 to implement blocks 530 and 540. Recall that the local sink apparatus 110 may comprise a local host and a local controller. The local host may send commands to the local controller through a local host controller interface (HCI), i.e., the local host may issue HCI commands. The local controller may provide notifications to the local host also through the local HCI, i.e., the local controller may provide HCI events.

To implement block 530, the local controller in block 630 may send a first CIS_ESTABLISHED_IND PDU to the remote sink apparatus 120, in particular, to the remote controller of the remote sink apparatus 120. To implement block 540, the local controller in block 640 may receive a second CIS_ESTABLISHED_IND PDU from the remote sink apparatus 120, in particular, from the remote controller of the remote sink apparatus 120.

As seen above, the first CIS_ESTABLISHED_IND_PDU may comprise one or more first CIS parameters useful for swapping CISes in the future (e.g., first remote public address, first CIG_ID, first CIS_ID, etc.). The second CIS_ESTABLISHED_IND PDU may comprise one or more second CIS parameters and one or more second CIS parameters also useful for swapping CISes in the future (e.g., second remote public address, second CIG_ID, second CIS_ID, etc.).

Referring back to FIG. 5A, after block 540, the method 500 may proceed to block 550 in FIG. 5B. In block 550, the local sink apparatus 110 may determine whether or not a CIS swap should be performed, i.e., determine whether the CIS ownerships should be swapped. In an aspect, block 550 may be performed subsequent to performing blocks 510 (establishing the first CIS) and 530 (receiving the second CIS indication informing of the second CIS).

Figure 7A:
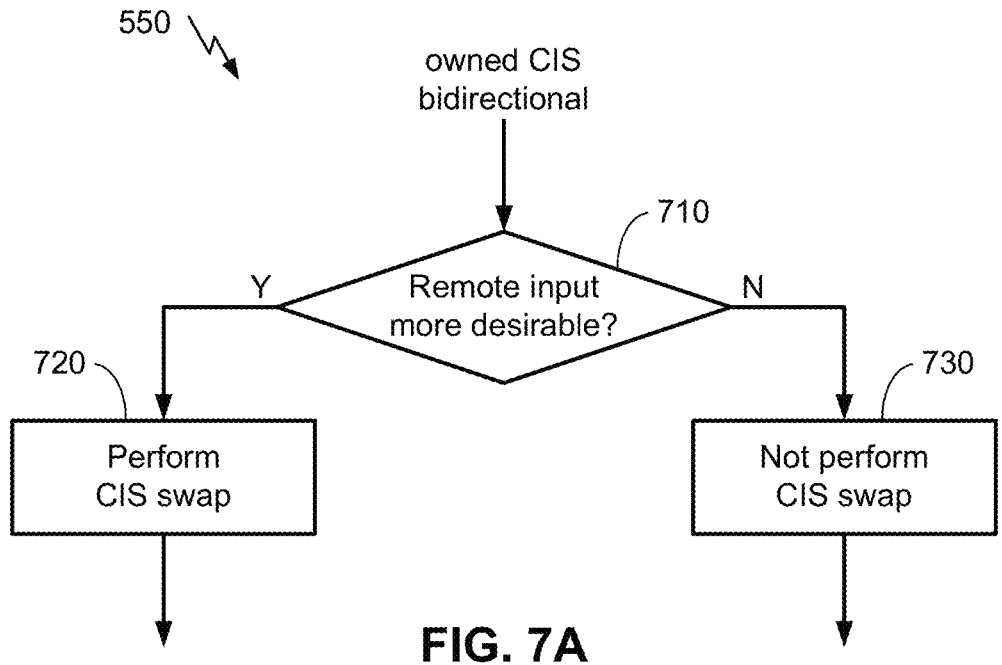
Figure 7B:
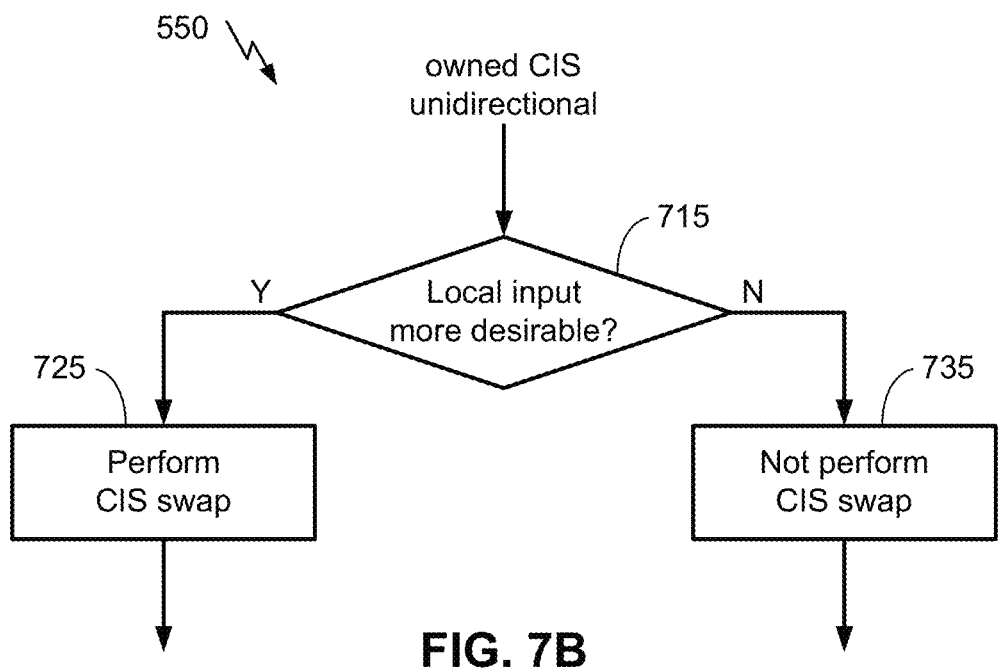

FIGS. 7A and 7B illustrate flow charts of example processes performed by the local sink apparatus 110 to implement block 550. Generally, the local sink apparatus 110 may comprise a local input device configured to generate local input data, and the remote sink apparatus 120 may comprise a remote input device configured to generate remote input data. The local and remote input data may be of same data type. For example, the local and remote input devices may be microphones. Since one of the first and second CISes is unidirectional, this implies that one of the local and remote input devices is disabled. To state it another way, whoever owns the unidirectional CIS, the input device of that owner is disabled. The flow charts of FIGS. 7A and 7B illustrate processes in which decision whether to perform the CIS swap is based on the desirability of the input from the disabled input device.

The process illustrated in FIG. 7A may be performed if the CIS owned by the local sink apparatus 110 is bidirectional. In this instance, prior to any CIS swapping, the first CIS is owned by the local sink apparatus 110. When the owned CIS (e.g., first CIS) is bidirectional, this implies that the local input device enabled and the remote input device is disabled. In block 710, the local sink apparatus 110 may determine whether or not the remote input—input at the remote sink apparatus 120—is more desirable. For example, the performance of the local input device may have deteriorated or may have stopped functioning all together. As another example, local sink apparatus 110 may be running low on battery power. The local sink apparatus 110 may communicate with the remote sink apparatus 120 to perform block 710.

If it is determined that the remote input is more desirable (Y branch from block 710), then in block 720, the local sink apparatus 110 may determine that the CIS swap should be performed. If it is not determined that the remote input is more desirable (N branch from block 710), then in block 730, the local sink apparatus 110 may determine that the CIS swap should not be performed.

The process illustrated in FIG. 7B may be performed if the owned CIS (e.g., first CIS) is unidirectional. This implies that the local input device is disabled and the remote input device is enabled. In block 715, the local sink apparatus 110 may determine whether or not the local input—input at the local sink apparatus 110—is more desirable. The local sink apparatus 110 may communicate with the remote sink apparatus 120 to perform block 715.

If it is determined that the local input is more desirable (Y branch from block 715), then in block 725, the local sink apparatus 110 may determine that the CIS swap should be performed. If it is not determined that the local input is more desirable (N branch from block 735), then in block 735, the local sink apparatus 110 may determine that the CIS swap should not be performed.

Referring back to FIG. 5B, when it is determined that the CIS swap should be performed (Y branch from block 550), then in block 560, the local sink apparatus 110 may perform the CIS swap. In an aspect, the CIS swap may comprise swapping ownerships of the first and second CISes with the remote sink apparatus 120. In other words, after the swap, the first CIS will be owned by the remote sink apparatus 120 and the second CIS will be owned by the local sink apparatus 110. As indicated, the source apparatus 130 need not have any knowledge of the CIS swap taking place.

Figure 8:
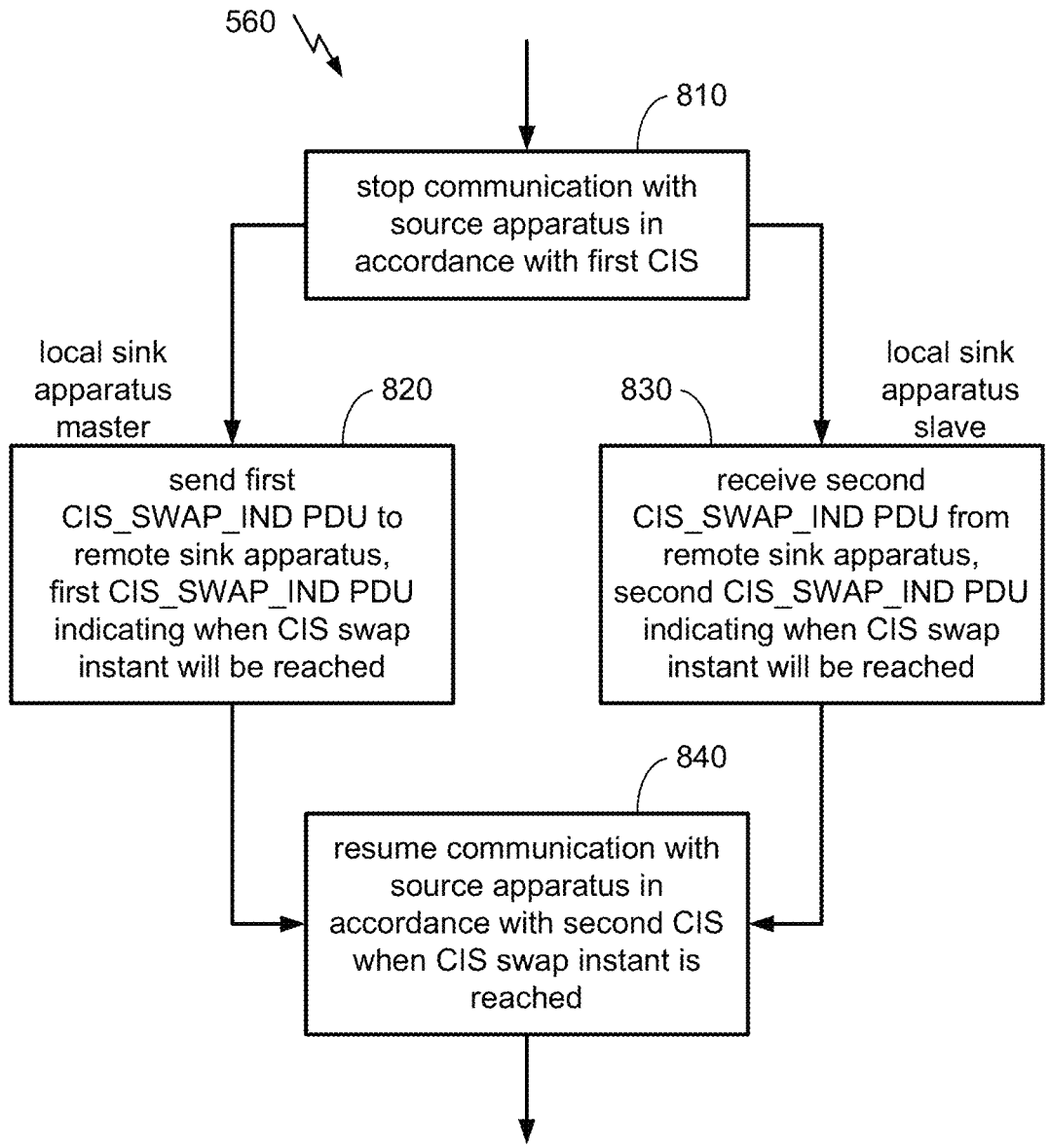

FIG. 8 illustrates a flow chart of an example process performed by the local sink apparatus 110 to implement block 560. In block 810, the local sink apparatus 110 may stop communicating with the source apparatus 130 in accordance with the first CIS. For example, the local sink apparatus 110 may stop accepting the isochronous stream from the source apparatus 130. The local sink apparatus 110 may also stop exchanging LL traffic.

Figure 9:
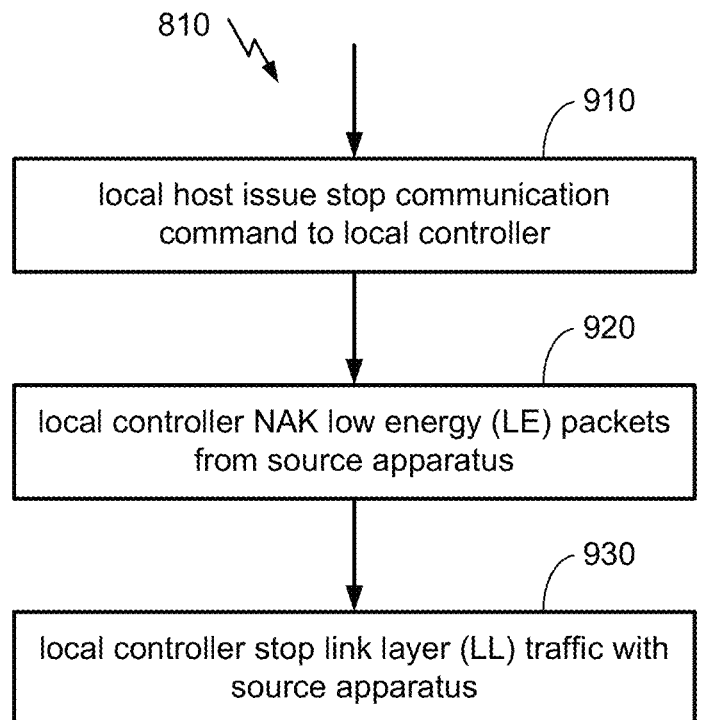

FIG. 9 illustrates a flow chart of an example process performed by the local sink apparatus 110 to implement block 810. In block 910, the local host may issue one or more stop communication commands to the local controller. The stop communication commands may be HCI commands. In response to the stop communication commands, in block 920, the local controller may NAK LE packets from the source apparatus 130. Also in response to the stop communication commands, in block 930, the local controller may stop LL traffic with the source apparatus 130.

Referring back to FIG. 8, subsequent to or contemporaneously with performing block 810, the method may proceed to block 820 if the local sink apparatus 110 is the master between the local sink apparatus and the remote sink apparatus 120, then the method may proceed to block 820. On the other hand, if the local sink apparatus 110 is the slave, then the method may proceed to block 830. Generally, when it is determined to perform the CIS swap, it may be desirable to synchronize the timing of the CIS swap between the local sink apparatus 110 and the remote sink apparatus 120. In an aspect, one of the local sink apparatus 110 and the remote sink apparatus 120 may determine such swap instant and notify the other. For example, a master may determine the swap instant and notify the slave.

Figure 10:
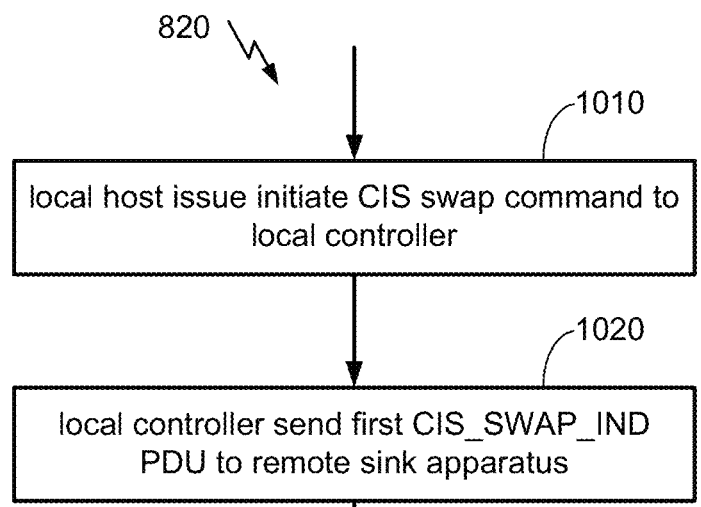

In FIG. 8, the method may proceed to block 820 if the local sink apparatus 110 is the master. In block 820, the local sink apparatus may send a first CIS_SWAP_IND PDU to the remote sink apparatus 120. The first CIS_SWAP_IND PDU may indicate when a CIS swap instant will be reached. FIG. 10 illustrates a flow chart of an example process performed by the local sink apparatus 110 to implement block 820. In block 1010, the local host may issue one or more initiate CIS swap commands to the local controller. The initiate CIS swap commands may be HCI commands. In response to the initiate CIS swap commands, in block 1020, the local controller may send the first CIS_SWAP_IND PDU to the remote sink apparatus 120, e.g., to the remote controller.

Figure 11:
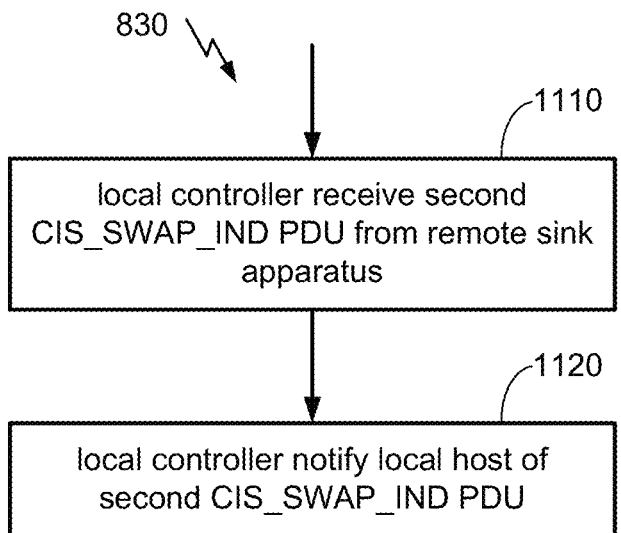

Referring back to FIG. 8, the method may proceed to block 830 if the local sink apparatus 110 is the slave. In block 830, the local sink apparatus may receive a second CIS_SWAP_IND PDU from the remote sink apparatus 120. The second CIS_SWAP_IND PDU may indicate when the CIS swap instant will be reached. FIG. 11 illustrates a flow chart of an example process performed by the local sink apparatus 110 to implement block 830. In block 1110, the local controller may receive the second CIS_SWAP_IND PDU from the remote sink apparatus, e.g., from the remote controller. In block 1120, the local controller may notify the local host of the received second CIS_SWAP_IND PDU. The local controller may provide one or more HCI events to notify the local host.

Figure 12:
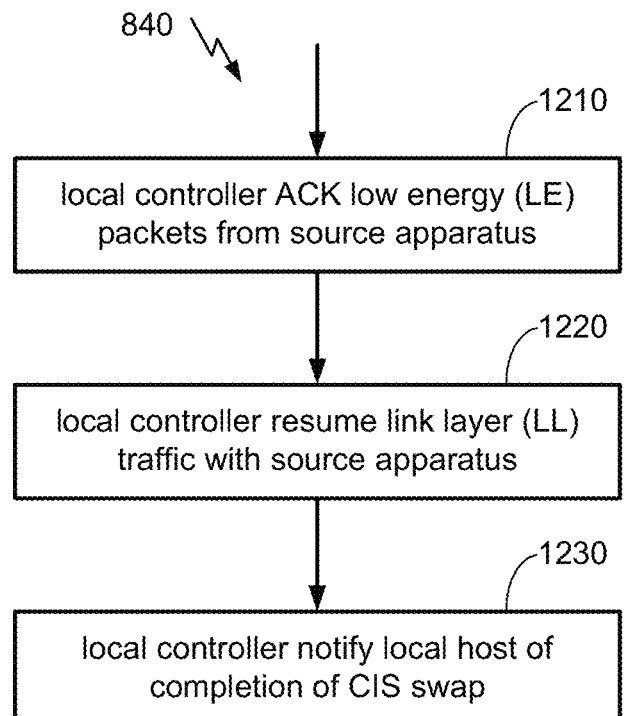

Referring back to FIG. 8, in block 840, when the CIS swap instant is reached, the local sink apparatus 110 may resume communication with the source apparatus 130 in accordance with the second CIS. That is, the local sink apparatus 110 may receive the second forward isochronous data streamed from the source apparatus 130. FIG. 12 illustrates a flow chart of an example process performed by the local sink apparatus 110 to implement block 840. In block 1210, the local controller may ACK the LE packets from the source apparatus 130. In block 1220, the local controller may resume the LL traffic with the source apparatus 130. In block 1230, the local controller may notify the local host of the CIS swap completion. The local controller may provide one or more HCI events to notify the local host.

Regarding the local and remote input devices, the following is observed. When the first and second CISes are respectively bidirectional and unidirectional, this means that the local sink apparatus 110 would own the bidirectional CIS before the swap and own the unidirectional CIS after the swap. Then the local input device may be enabled prior to the CIS swap and disabled subsequent to the CIS swap.

On the other hand, when the first and second CISes are respectively the unidirectional and bidirectional links, the circumstances may be reversed, i.e., the local sink apparatus 110 would own the unidirectional CIS before the swap and own the bidirectional CIS after the swap. Then the local input device may be disabled prior to the CIS swap and enabled subsequent to the CIS swap.

It has been indicated above that when it is decided to swap the CIS ownerships, the ACL ownerships may also be swapped. Referring back to FIG. 5A, recall that in block 520, the local sink apparatus 110 may establish the first ACL with the source apparatus 130 to exchange control and/or user data. The first ACL may be established before swapping CISes.

If it is decided that the ACL ownerships should be swapped in addition to swapping the CIS ownerships, the method may proceed to block 570 in FIG. 5B. In block 570, the local sink apparatus 110 may perform the ACL swap. In an aspect, the ACL swap may comprise swapping ownerships of first and second ACLs with the remote sink apparatus 120, i.e., the first ACL will be owned by the remote sink apparatus 120 and the second ACL will be owned by the local sink apparatus 110. The second ACL may be established between the remote sink apparatus (120) and the source apparatus (130) to exchange control and/or user data therebetween. Similar to the first ACL, the second ACL may also be established prior to swapping the CISes. After the completion of the ACL swap, the local and remote sink apparatuses 110, 120 may exchange the control and/or the user data with the source apparatus 130 respectively in accordance with the second and first ACLs. Further, the source apparatus 130 need not have any knowledge of the ACL swap taking place.

Figure 13:
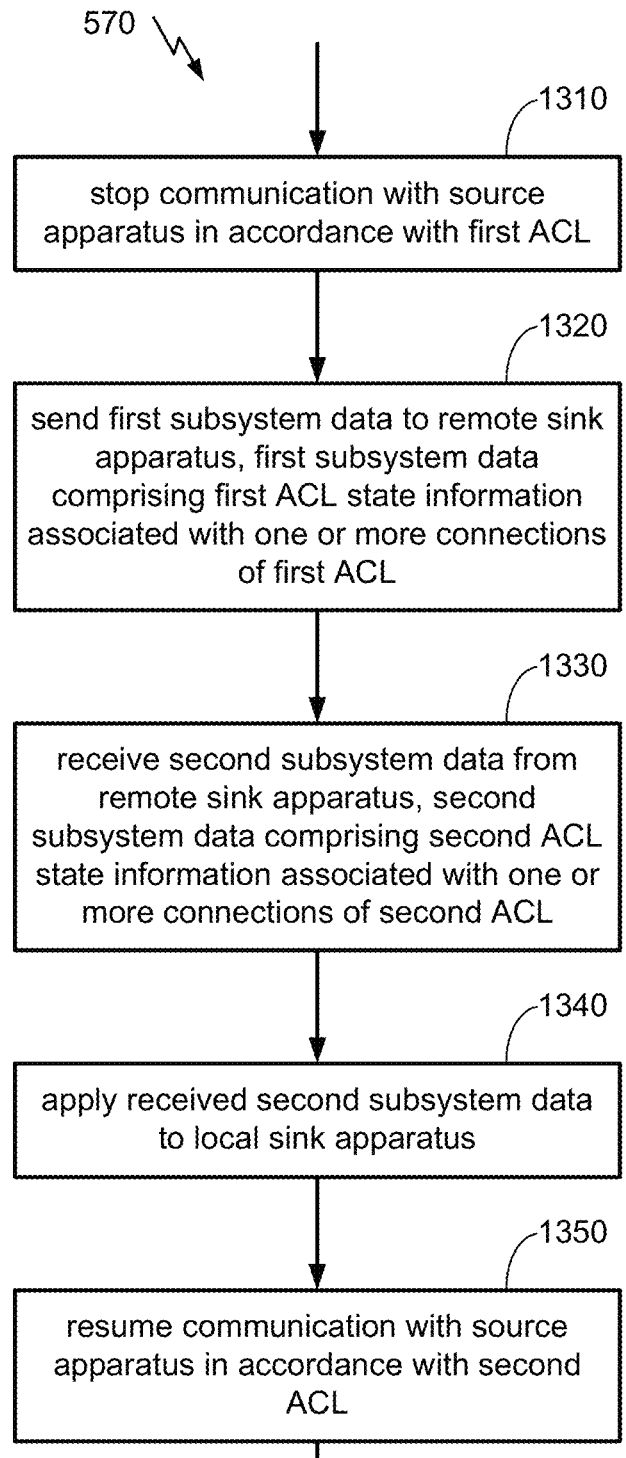

FIG. 13 illustrates an example process performed by the local sink apparatus 110 to implement block 570. In block 1310, the local sink apparatus 110 may stop communicating with the source apparatus 130 in accordance with the first ACL. For example, the local sink apparatus 110 may stop exchanging control and/or user data with the source apparatus 130.

Figure 14:
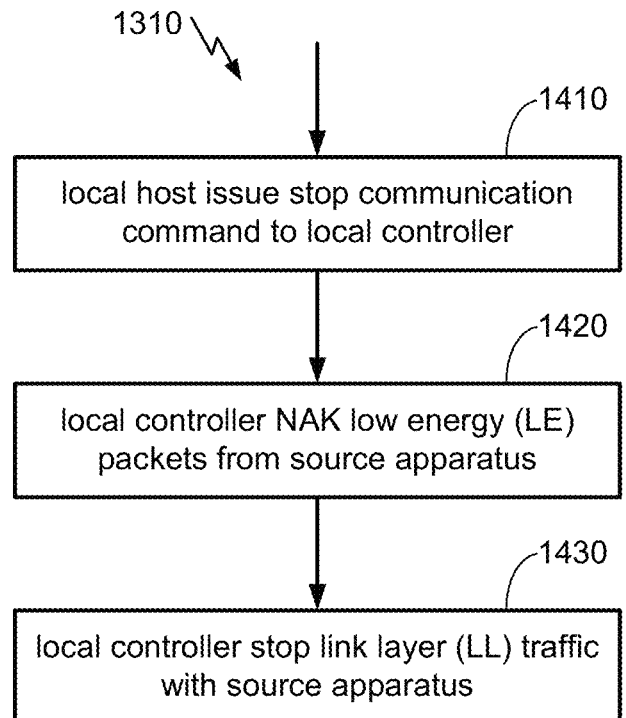

FIG. 14 illustrates a flow chart of an example process performed by the local sink apparatus 110 to implement block 1310. In block 1410, the local host may issue one or more stop communication commands to the local controller. The stop communication commands may be HCI commands. In response to the stop communication commands, in block 1420, the local controller may NAK LE packets from the source apparatus 130. Also in response to the stop communication commands, in block 1430, the local controller may stop LL traffic with the source apparatus 130.

Referring back to FIG. 13, the local sink apparatus 110 may exchange subsystem data with the remote sink apparatus 120 in blocks 1320 and 1330. In block 1320, the local sink apparatus 110 may send a first subsystem data (e.g., Bluetooth subsystem (BTSS) data) to the remote sink apparatus 120. The first subsystem data may comprise first ACL state information associated with one or more connections of the first ACL.

Figure 15:
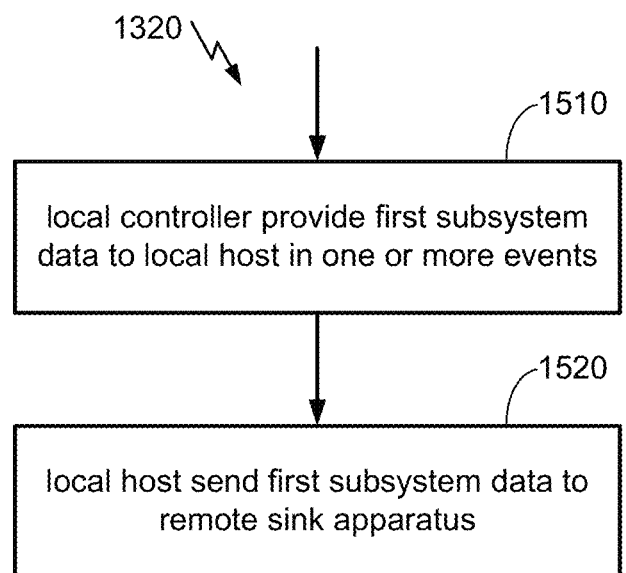

FIG. 15 illustrates a flow chart of an example process performed by the local sink apparatus 110 to implement block 1320. In block 1510, the local host may provide the first subsystem data to the local host in one or more events. The events may be HCI events. In block 1520, the local host may send the first subsystem data to the remote sink apparatus 120. In particular, the first subsystem data may be sent to the remote host. The first subsystem data may be sent through the local controller.

Referring back to FIG. 13, in block 1330, the local sink apparatus 110 may receive a second subsystem data (e.g., BTSS data) from the remote sink apparatus 120. The second subsystem data may comprise second ACL state information associated with one or more connections of the second ACL. In block 1340, the local sink apparatus 110 may apply the received second subsystem data to the local sink apparatus 110.

Figure 16:
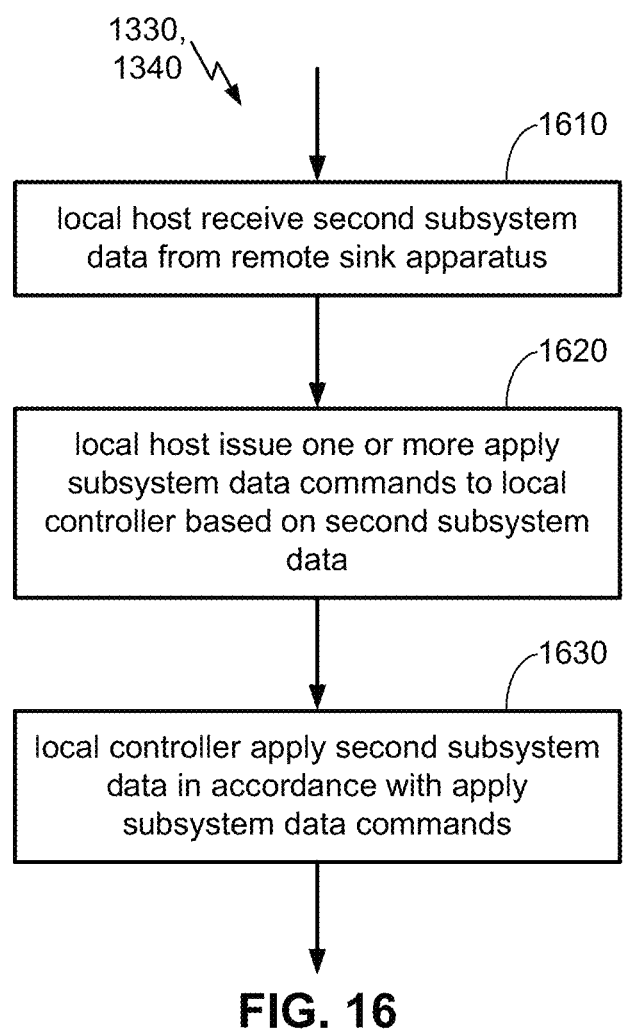

FIG. 16 illustrates a flow chart of an example process performed by the local sink apparatus 110 to implement blocks 1330 and 1340. In block 1610, the local host may receive the second subsystem data from the remote sink apparatus 120. In particular, the second subsystem data may be received from the remote host. The second subsystem data may be received through the local controller. In block 1620, the local host may issue one or more apply subsystem data commands to the local controller based on the second subsystem data. The apply subsystem data commands may be HCI commands. In block 1630, the local controller may apply the second subsystem data in accordance with the apply subsystem data commands.

Figure 17:
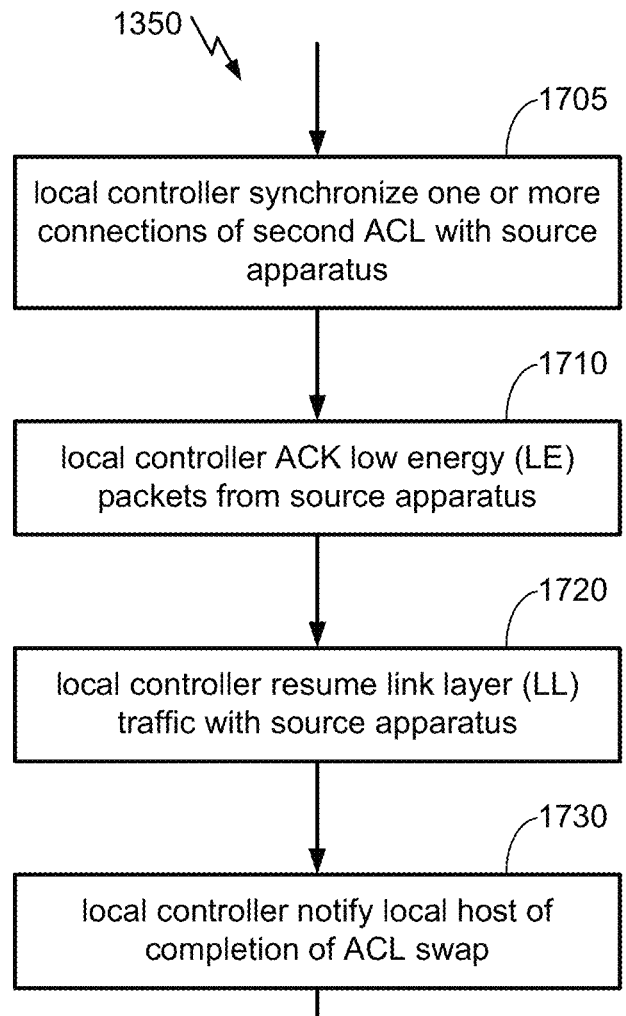

Referring back to FIG. 13, in block 1350, the local sink apparatus 110 may resume communication with the source apparatus 130 in accordance with the second ACL. That is, the local sink apparatus 110 may exchange control and/or user data with the source apparatus 130 over the second ACL. FIG. 17 illustrates a flow chart of an example process performed by the local sink apparatus 110 to implement block 1350. In block 1705, the local controller may synchronize one or more connects of the second ACL with the source apparatus 130. In block 1710, the local controller may ACK the LE packets from the source apparatus 130. In block 1720, the local controller may resume the LL traffic with the source apparatus 130. In block 1730, the local controller may notify the local host of the ACL swap completion. The local controller may provide one or more HCI events to notify the local host.

It should be noted that not all illustrated blocks of FIGS. 5A-17 need be performed, i.e., some blocks may be optional. Also, the numerical references to the blocks in these figures should not be taken as requiring that the blocks should be performed in a certain order. Indeed, some blocks may be performed concurrently.

The terminology used herein is for the purpose of describing particular embodiments only and not to limit any embodiments disclosed herein. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof. Similarly, the phrase "based on" as used herein does not necessarily preclude influence of other factors and should be interpreted in all cases as "based at least in part on" rather than, for example, "based solely on".

Moreover, the phrase "coupled to" in electrical contexts encompasses any suitable method for delivering an electrical signal from a first node to a second node. As such, "coupled to" may encompass "coupled directly to" (for example, by direct conductive connection, such as with a copper wire, a solder ball, etc.) as well as "coupled indirectly to" (for example, having one or more intervening structures therebetween, such as a switch, a buffer, a filter, etc.). It will be further understood that terms such as "top" and "bottom", "left" and "right", "vertical" and "horizontal", etc., are relative terms used strictly in relation to one another, and do not express or imply any relation with respect to gravity, a manufacturing device used to manufacture the components described herein, or to some other device to which the components described herein are coupled, mounted, etc. It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not imply that there are only two elements and further does not imply that the first and second elements are consecutive or that the first element precedes the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements."

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code for providing the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of non-transitory storage medium known in the art. As used herein the term "non-transitory" does not exclude any physical storage medium or memory and particularly does not exclude dynamic memory (e.g., RAM) but rather excludes only the interpretation that the medium can be construed as a transitory propagating signal. An example storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method performed by a local sink apparatus, comprising:
    establishing a first connected isochronous stream (CIS) for communication with a source apparatus, the first CIS being one of a bidirectional or a unidirectional link;
    sending a first CIS indication to a remote sink apparatus, the first CIS indication informing the remote sink apparatus of the first CIS established between the local sink apparatus and the source apparatus;
    receiving a second CIS indication from the remote sink apparatus, the second CIS indication informing the local sink apparatus of a second CIS established between the remote sink apparatus and the source apparatus, the second CIS being the other of the bidirectional or the unidirectional link;
    determining, subsequent to establishing the first CIS and subsequent to receiving the second CIS indication from the remote sink apparatus, whether or not a CIS swap should be performed; and
    performing the CIS swap when it is determined that the CIS swap should be performed, the CIS swap comprising swapping ownerships of the first and second CISes with the remote sink apparatus, wherein after completing the CIS swap, the local and remote sink apparatuses communicate with the source apparatus respectively in accordance with the second and first CISes, and wherein the CIS swap is performed without involving the source apparatus.

2. The method of claim 1, wherein the first and second CISes belong to a same connected isochronous group (CIG).

3. The method of claim 1, wherein the first and second CISes are used by the source apparatus to stream audio data.

4. The method of claim 1,
    wherein the local sink apparatus comprises a local input device configured to generate local input data,
    wherein when the first and second CISes are respectively the bidirectional and unidirectional links,
        prior to swapping the CIS ownership, the local input device is enabled, and
        subsequent to swapping the CIS ownership, the local input device is disabled, and
    wherein when the first and second CISes are respectively the unidirectional and bidirectional links,
        prior to swapping the CIS ownership, the local input device is disabled, and
        subsequent to swapping the CIS ownership, the local input device is enabled.

5. The method of claim 4, wherein the input device is a microphone.

6. The method of claim 1,
    wherein the local sink apparatus comprises a local controller,
    wherein sending the first CIS indication comprises sending, by the local controller, a first CIS_ESTABLISHED_IND protocol data unit (PDU) to the remote sink apparatus, the first CIS_ESTABLISHED_IND PDU comprising first CIS parameters, and
    wherein receiving the second CIS indication comprises receiving, by the local controller, a second CIS_ESTABLISHED_IND PDU from the remote sink apparatus, the second CIS_ESTABLISHED_IND PDU comprising second CIS parameters.

7. The method of claim 6,
    wherein the first CIS parameters comprise one or more of a first remote public address indicating a public address of an apparatus associated with which the first CIS has been created, a first CIG_ID indicating an identifier of a connected isochronous group (CIG) that the first CIS is a part of, and a first CIS_ID indicating an identifier of a CIS that is to be swapped in the future with the first CIS, and
    wherein the second CIS parameters comprise one or more of a second remote public address indicating a public address of an apparatus associated with which the second CIS has been created, a second CIG_ID indicating an identifier of a CIG that the second CIS is a part of, and a second CIS_ID indicating an identifier of a CIS that is to be swapped in the future with the second CIS.

8. The method of claim 1,
    wherein the local and remote sink apparatuses respectively comprise local and remote input devices respectively configured to generate local and remote input data, the local and remote input data being data of same type,
    wherein when the first and second CISes are respectively the bidirectional and unidirectional links, determining whether or not the CIS swap should be performed comprises:
        determining whether remote input more is more desirable; and
        determining that the CIS swap should be performed when it is determined that the remote input more is more desirable; and
        determining that the CIS swap should not be performed when it is not determined that the remote input more is more desirable, and
    wherein when the first and second CISes are respectively the unidirectional and bidirectional links, determining whether or not the CIS swap should be performed comprises:
        determining whether the local input more is more desirable; and determining that the CIS swap should be performed when it is determined that the local input more is more desirable; and determining that the CIS swap should not be performed when it is not determined that the local input more is more desirable.

9. The method of claim 8, wherein the local sink apparatus communicates with the remote sink apparatus in determining whether the remote input more is more desirable and/or in determining whether the local input more is more desirable.

10. The method of claim 8, wherein the local and remote input devices are local and remote microphones.

11. The method of claim 1, wherein performing the CIS swap comprises:
stopping communication with the source apparatus in accordance with the first CIS subsequent to determining that the CIS swap should be performed;
sending a first CIS_SWAP_IND protocol data unit (PDU) to the remote sink apparatus when the local sink apparatus is a master and the remote sink apparatus is a slave, the first CIS_SWAP_IND PDU indicating when a CIS swap instant will be reached;
receiving a second CIS_SWAP_IND PDU from the remote sink apparatus when the local sink apparatus is the slave and the remote sink apparatus is the master, the second CIS_SWAP_IND PDU indicating when the CIS swap instant will be reached; and
resuming communication with the source apparatus in accordance with the second CIS when the CIS swap instant is reached.

12. The method of claim 11,
wherein the local sink apparatus comprises a local host and a local controller, and
wherein stopping communication with the source apparatus comprises:
issuing, by the local host, a stop communication command to the local controller;
NAKing, by the local controller, low energy (LE) packets from the source apparatus in response to the stop communication command; and
stopping, by the local controller, link layer (LL) traffic with the source apparatus in response to the stop communication command.

13. The method of claim 11,
wherein the local sink apparatus comprises a local host and a local controller, and
wherein sending the first CIS_SWAP_IND PDU comprises:
issuing, by the local host, an initiate CIS swap command to the local controller; and
sending, by the local controller, the first CIS_SWAP_IND PDU to the remote sink apparatus in response to the initiate CIS swap command.

14. The method of claim 11,
wherein the local sink apparatus comprises a local host and a local controller, and
wherein receiving the second CIS_SWAP_IND PDU comprises:
receiving, by the local controller, the second CIS_SWAP_IND PDU from the remote sink apparatus; and
notifying, by the local controller, the local host of the received second CIS_SWAP_IND PDU.

15. The method of claim 11,
wherein the local sink apparatus comprises a local host and a local controller, and wherein resuming communication with the source apparatus comprises:
ACKing, by the local controller, low energy (LE) packets from the source apparatus;
resuming, by the local controller, link layer (LL) traffic with the source apparatus; and
notifying, by the local controller, the local host of completion of the CIS swap.

16. The method of claim 1, further comprising:
establishing, prior to determining whether to perform the CIS swap, a first asynchronous connection logical (ACL) for exchange of control and/or user data with the source apparatus; and
performing, subsequent to determining that the CIS swap should be performed, an ACL swap comprising swapping ownerships of the first ACL and a second ACL with the remote sink apparatus, the second ACL having been established between the remote sink apparatus and the source apparatus to exchange control and/or user data therebetween prior to determining that the CIS swap should be performed, wherein after completing the ACL swap, the local and remote sink apparatuses exchange the control and/or the user data with the source apparatus respectively in accordance with the second and first ACLs.

17. The method of claim 16, wherein the ACL swap is performed without involving the source apparatus.

18. The method of claim 16, wherein performing the ACL swap comprises:
stopping communication with the source apparatus in accordance with the first ACL subsequent to determining that the CIS swap should be performed;
sending a first subsystem data to the remote sink apparatus, the first subsystem data comprising first ACL state information associated with one or more connections of the first ACL;
receiving a second subsystem data from the remote sink apparatus, the second subsystem data comprising second ACL state information associated with one or more connection the second ACL;
applying the received second subsystem data to the local sink apparatus; and
resuming communication with the source apparatus in accordance with the second ACL.

19. The method of claim 18,
wherein the local sink apparatus comprises a local host and a local controller, and
wherein stopping communication with the source apparatus comprises:
issuing, by the local host, a stop communication command to the local controller;
NAKing, by the local controller, low energy (LE) packets from the source apparatus in response to the stop communication command; and
stopping, by the local controller, link layer (LL) traffic with the source apparatus in response to the stop communication command.

20. The method of claim 18,
wherein the local sink apparatus comprises a local host and a local controller, and
wherein sending the first subsystem data comprises:
providing, by the local controller, the first ACL state information to the local host in one or more events; and
sending, by the local host, the first ACL state information to the remote sink apparatus.

21. The method of claim 18,
wherein the local sink apparatus comprises a local host and a local controller, and
wherein receiving the second subsystem data and applying the received subsystem data comprises:
 receiving, by the local host, the second subsystem data from the remote sink apparatus;
 issuing, by the local host, one or more apply subsystem data commands to the local controller, the apply subsystem data commands being issued based on the second subsystem data; and
 applying, by the local controller, the second subsystem data in accordance with the apply subsystem data commands.

22. The method of claim 18,
wherein the local sink apparatus comprises a local host and a local controller, and
wherein resuming communication with the source apparatus comprises:
 synchronizing, by the local controller, one or more connections of the second ACL with the source apparatus;
 ACKing, by the local controller, low energy (LE) packets from the source apparatus;
 resuming, by the local controller, link layer (LL) traffic with the source apparatus; and
 notifying, by the local controller, the local host of completion of the ACL swap.

23. The method of claim 1, wherein the local and remote sink apparatuses and the source apparatus are Bluetooth apparatuses.

24. A local sink apparatus, comprising:
a processor;
a memory; and
a transceiver,
wherein the processor, the memory, and/or the transceiver are configured to:
 establish a first connected isochronous stream (CIS) for communication with a source apparatus, the first CIS being one of a bidirectional or a unidirectional link;
 send a first CIS indication to a remote sink apparatus, the first CIS indication informing the remote sink apparatus of the first CIS established between the local sink apparatus and the source apparatus;
 receive a second CIS indication from the remote sink apparatus, the second CIS indication informing the local sink apparatus of a second CIS established between the remote sink apparatus and the source apparatus, the second CIS being the other of the bidirectional or the unidirectional link;
 determine, subsequent to establishing the first CIS and subsequent to receiving the second CIS indication from the remote sink apparatus, whether or not a CIS swap should be performed; and
 perform the CIS swap when it is determined that the CIS swap should be performed, the CIS swap comprising swapping ownerships of the first and second CISes with the remote sink apparatus, wherein after completing the CIS swap, the local and remote sink apparatuses communicate with the source apparatus respectively in accordance with the second and first CISes, and wherein the CIS swap is performed without involving the source apparatus.

25. The local sink apparatus of claim 24, wherein the first and second CISes belong to a same connected isochronous group (CIG).

26. The local sink apparatus of claim 24, wherein the first and second CISes are used by the source apparatus to stream audio data.

27. The local sink apparatus of claim 24,
wherein the local sink apparatus comprises a local input device configured to generate local input data,
wherein when the first and second CISes are respectively the bidirectional and unidirectional links,
 prior to swapping the CIS ownership, the local input device is enabled, and
 subsequent to swapping the CIS ownership, the local input device is disabled, and
wherein when the first and second CISes are respectively the unidirectional and bidirectional links,
 prior to swapping the CIS ownership, the local input device is disabled, and
 subsequent to swapping the CIS ownership, the local input device is enabled.

28. The local sink apparatus of claim 27, wherein the input device is a microphone.

29. The local sink apparatus of claim 24,
wherein the processor, the memory, and/or the transceiver are configured to implement operations of a local controller,
wherein in sending the first CIS indication, the local controller sends a first CIS_ESTABLISHED_IND protocol data unit (PDU) to the remote sink apparatus, the first CIS_ESTABLISHED_IND PDU comprising first CIS parameters, and
wherein in receiving the second CIS indication, the local controller receives a second CIS_ESTABLISHED_IND PDU from the remote sink apparatus, the second CIS_ESTABLISHED_IND PDU comprising second CIS parameters.

30. The local sink apparatus of claim 29,
wherein the first CIS parameters comprise one or more of a first remote public address indicating a public address of an apparatus associated with which the first CIS has been created, a first CIG_ID indicating an identifier of a connected isochronous group (CIG) that the first CIS is a part of, and a first CIS_ID indicating an identifier of a CIS that is to be swapped in the future with the first CIS, and
wherein the second CIS parameters comprise one or more of a second remote public address indicating a public address of an apparatus associated with which the second CIS has been created, a second CIG_ID indicating an identifier of a CIG that the second CIS is a part of, and a second CIS_ID indicating an identifier of a CIS that is to be swapped in the future with the second CIS.

31. The local sink apparatus of claim 24,
wherein the local and remote sink apparatuses respectively comprise local and remote input devices respectively configured to generate local and remote input data, the local and remote input data being data of same type,
wherein when the first and second CISes are respectively the bidirectional and unidirectional links, in determining whether or not the CIS swap should be performed, the processor, the memory, and/or the transceiver are configured to:
 determine whether remote input more is more desirable; and
 determine that the CIS swap should be performed when it is determined that the remote input more is more desirable; and determine that the CIS swap should not be performed when it is not determined that the remote input more is more desirable, and wherein when the first and second CISes are respectively the unidirectional and bidirectional links, in determining whether or not the CIS swap should be performed, the processor, the memory, and/or the transceiver are configured to:

determine whether the local input more is more desirable; and determine that the CIS swap should be performed when it is determined that the local input more is more desirable; and determine that the CIS swap should not be performed when it is not determined that the local input more is more desirable.

32. The local sink apparatus of claim 31, wherein the local sink apparatus communicates with the remote sink apparatus in determining whether the remote input more is more desirable and/or in determining whether the local input more is more desirable.

33. The local sink apparatus of claim 31, wherein the local and remote input devices are local and remote microphones.

34. The local sink apparatus of claim 24, wherein in performing the CIS swap, the processor, the memory, and/or the transceiver are configured to:

stop communication with the source apparatus in accordance with the first CIS subsequent to determining that the CIS swap should be performed;

send a first CIS_SWAP_IND protocol data unit (PDU) to the remote sink apparatus when the local sink apparatus is a master and the remote sink apparatus is a slave, the first CIS_SWAP_IND PDU indicating when a CIS swap instant will be reached;

receive a second CIS_SWAP_IND PDU from the remote sink apparatus when the local sink apparatus is the slave and the remote sink apparatus is the master, the second CIS_SWAP_IND PDU indicating when the CIS swap instant will be reached; and resume communication with the source apparatus in accordance with the second CIS when the CIS swap instant is reached.

35. The local sink apparatus of claim 34, wherein the processor, the memory, and/or the transceiver are configured to implement operations of a local host and a local controller, and wherein in stopping communication with the source apparatus:

the local host issues a stop communication command to the local controller;

the local controller NAKs low energy (LE) packets from the source apparatus in response to the stop communication command; and the local controller stops link layer (LL) traffic with the source apparatus in response to the stop communication command.

36. The local sink apparatus of claim 34, wherein the processor, the memory, and/or the transceiver are configured to implement operations of a local host and a local controller, and wherein in sending the first CIS_SWAP_IND PDU:

the local host issues an initiate CIS swap command to the local controller; and the local controller sends the first CIS_SWAP_IND PDU to the remote sink apparatus in response to the initiate CIS swap command.

37. The local sink apparatus of claim 34, wherein the processor, the memory, and/or the transceiver are configured to implement operations of a local host and a local controller, and wherein in receiving the second CIS_SWAP_IND PDU:

the local controller receives the second CIS_SWAP_IND PDU from the remote sink apparatus; and the local controller notifies the local host of the received second CIS_SWAP_IND PDU.

38. The local sink apparatus of claim 34, wherein the processor, the memory, and/or the transceiver are configured to implement operations of a local host and a local controller, and wherein in resuming communication with the source apparatus:

the local controller ACKs low energy (LE) packets from the source apparatus;

the local controller resumes link layer (LL) traffic with the source apparatus; and the local controller notifies the local host of completion of the CIS swap.

39. The local sink apparatus of claim 24, wherein the processor, the memory, and/or the transceiver are further configured to:

establish, prior to determining whether to perform the CIS swap, a first asynchronous connection logical (ACL) for exchange of control and/or user data with the source apparatus; and perform, subsequent to determining that the CIS swap should be performed, an ACL swap comprising swapping ownerships of the first ACL and a second ACL with the remote sink apparatus, the second ACL having been established between the remote sink apparatus and the source apparatus to exchange control and/or user data therebetween prior to determining that the CIS swap should be performed, wherein after completing the ACL swap, the local and remote sink apparatuses exchange the control and/or the user data with the source apparatus respectively in accordance with the second and first ACLs.

40. The local sink apparatus of claim 39, wherein the ACL swap is performed without involving the source apparatus.

41. The local sink apparatus of claim 39, wherein in performing the ACL swap, the processor, the memory, and/or the transceiver are configured to:

stop communication with the source apparatus in accordance with the first ACL subsequent to determining that the CIS swap should be performed;

send a first subsystem data to the remote sink apparatus, the first subsystem data comprising first ACL state information associated with one or more connections of the first ACL;

receive a second subsystem data from the remote sink apparatus, the second subsystem data comprising second ACL state information associated with one or more connection the second ACL;

apply the received second subsystem data to the local sink apparatus; and resume communication with the source apparatus in accordance with the second ACL.

42. The local sink apparatus of claim 41, wherein the processor, the memory, and/or the transceiver are configured to implement operations of a local host and a local controller, and wherein in stopping communication with the source apparatus:

the local host issues a stop communication command to the local controller;

the local controller NAKs low energy (LE) packets from the source apparatus in response to the stop communication command; and the local controller stops link layer (LL) traffic with the source apparatus in response to the stop communication command.

43. The local sink apparatus of claim 41, wherein the processor, the memory, and/or the transceiver are configured to implement operations of a local host and a local controller, and wherein in sending the first subsystem data:

the local controller provides the first ACL state information to the local host in one or more events; and the local host sends the first ACL state information to the remote sink apparatus.

44. The local sink apparatus of claim 41, wherein the processor, the memory, and/or the transceiver are configured to implement operations of a local host and a local controller, and wherein in receiving the second subsystem data and applying the received subsystem data:

the local host receives the second subsystem data from the remote sink apparatus;

the local host issues one or more apply subsystem data commands to the local controller, the apply subsystem data commands being issued based on the second subsystem data; and the local controller apply the second subsystem data in accordance with the apply subsystem data commands.

45. The local sink apparatus of claim 41, wherein the processor, the memory, and/or the transceiver are configured to implement operations of a local host and a local controller, and wherein in resuming communication with the source apparatus comprises:

the local controller synchronizes one or more connections of the second ACL with the source apparatus;

the local controller ACKs low energy (LE) packets from the source apparatus;

the local controller resumes link layer (LL) traffic with the source apparatus; and the local controller notifies the local host of completion of the ACL swap.

46. The local sink apparatus of claim 24, wherein the local and remote sink apparatuses and the source apparatus are Bluetooth apparatuses.

47. A local sink apparatus, comprising:

means for establishing a first connected isochronous stream (CIS) for communication with a source apparatus, the first CIS being one of a bidirectional or a unidirectional link;

means for sending a first CIS indication to a remote sink apparatus, the first CIS indication informing the remote sink apparatus of the first CIS established between the local sink apparatus and the source apparatus;

means for receiving a second CIS indication from the remote sink apparatus, the second CIS indication informing the local sink apparatus of a second CIS established between the remote sink apparatus and the source apparatus, the second CIS being the other of the bidirectional or the unidirectional link;

means for determining, subsequent to establishing the first CIS and subsequent to receiving the second CIS indication from the remote sink apparatus, whether or not a CIS swap should be performed; and means for performing the CIS swap when it is determined that the CIS swap should be performed, the CIS swap comprising swapping ownerships of the first and second CISes with the remote sink apparatus, wherein after completing the CIS swap, the local and remote sink apparatuses communicate with the source apparatus respectively in accordance with the second and first CISes, and wherein the CIS swap is performed without involving the source apparatus.

48. A non-transitory computer-readable medium storing computer-executable instructions for a local sink apparatus, the computer-executable instructions comprising:

one or more instructions causing the local sink apparatus to establish a first connected isochronous stream (CIS) for communication with a source apparatus, the first CIS being one of a bidirectional or a unidirectional link;

one or more instructions causing the local sink apparatus to send a first CIS indication to a remote sink apparatus, the first CIS indication informing the remote sink apparatus of the first CIS established between the local sink apparatus and the source apparatus;

one or more instructions causing the local sink apparatus to receive a second CIS indication from the remote sink apparatus, the second CIS indication informing the local sink apparatus of a second CIS established between the remote sink apparatus and the source apparatus, the second CIS being the other of the bidirectional or the unidirectional link;

one or more instructions causing the local sink apparatus to determine, subsequent to establishing the first CIS and subsequent to receiving the second CIS indication from the remote sink apparatus, whether or not a CIS swap should be performed; and one or more instructions causing the local sink apparatus to perform the CIS swap when it is determined that the CIS swap should be performed, the CIS swap comprising swapping ownerships of the first and second CISes with the remote sink apparatus, wherein after completing the CIS swap, the local and remote sink apparatuses communicate with the source apparatus respectively in accordance with the second and first CISes, and wherein the CIS swap is performed without involving the source apparatus.

* * * * *